United States Patent
Singh et al.

(10) Patent No.: US 12,299,039 B2
(45) Date of Patent: May 13, 2025

(54) GRAPH BASED PREDICTIVE INFERENCES FOR DOMAIN TAXONOMY

(71) Applicant: Optum, Inc., Minnetonka, MN (US)

(72) Inventors: Savindra Singh, Uttar Pradesh (IN); Neelabh Mishra, New Delhi (IN); Sanchit Kumar, Uttar Pradesh (IN); Sana Zehra, New Delhi (IN)

(73) Assignee: OPTUM, INC., Minnetonka, MN (US)

( * ) Notice: Subject to any disclaimer, the term of this patent is extended or adjusted under 35 U.S.C. 154(b) by 117 days.

(21) Appl. No.: 18/180,376

(22) Filed: Mar. 8, 2023

(65) Prior Publication Data

US 2024/0303276 A1 Sep. 12, 2024

(51) Int. Cl.
- G06F 17/00 (2019.01)
- G06F 7/00 (2006.01)
- G06F 16/901 (2019.01)
- G06F 16/906 (2019.01)

(52) U.S. Cl.
CPC ........ G06F 16/9024 (2019.01); G06F 16/906 (2019.01)

(58) Field of Classification Search
CPC .......................... G06F 16/9024; G06F 16/906
USPC ....................................................... 707/798
See application file for complete search history.

(56) References Cited

U.S. PATENT DOCUMENTS

| | | | |
|---|---|---|---|
| 10,084,805 B2 | 9/2018 | Nadolski et al. | |
| 10,133,250 B2 | 11/2018 | Kohn et al. | |
| 10,628,834 B1 | 4/2020 | Agarwal et al. | |
| 10,755,804 B2 | 8/2020 | Katwala et al. | |
| 10,824,958 B2 | 11/2020 | Ramage et al. | |
| 11,157,808 B2 | 10/2021 | Wetta | |
| 11,361,082 B2 | 6/2022 | Obee et al. | |
| 11,443,164 B2 | 9/2022 | Dalli et al. | |
| 2013/0054259 A1 | 2/2013 | Wojtusiak et al. | |
| 2013/0332194 A1 | 12/2013 | D'Auria et al. | |

(Continued)

FOREIGN PATENT DOCUMENTS

| | | |
|---|---|---|
| IN | 202241026575 A | 6/2022 |
| WO | 2013/181564 A1 | 12/2013 |
| WO | 2021/141744 A1 | 7/2021 |

OTHER PUBLICATIONS

Gopal, K. Madan. "Building Safeguards and System Fencing Against Opportunistic Malpractice' In Ayushman Barat: Pradhan Mantri Jan Arogya Yojana (PMJAY) (National Health Protection Mission)," Technical Report, Aug. 24, 2018, (43 pages).

*Primary Examiner* — Pavan Mamillapalli
(74) *Attorney, Agent, or Firm* — Alston & Bird LLP

(57) ABSTRACT

Various embodiments of the present disclosure provide graph-based techniques for generating granular predictive classifications for entities in a predictive domain. The graph-based techniques include generating a network graph for an entity or entity class based on a plurality of interaction data objects for the entity. The network graph includes a plurality of nodes and a plurality of edges. Each node corresponds to a particular interaction code of at least one of the plurality of interaction data objects. Each edge connects a node pair that is associated with a particular interaction data object. The nodes and edges are weighted to enable the clustering of the network graph for an entity class. An entity network graph may be compared to node clusters of a class network graph to generate a behavior based predictive classification.

20 Claims, 9 Drawing Sheets

(56) References Cited

U.S. PATENT DOCUMENTS

| | | |
|---|---|---|
| 2014/0149128 A1 | 5/2014 | Getchius |
| 2015/0039333 A1 | 2/2015 | de Traversay et al. |
| 2016/0092475 A1* | 3/2016 | Stojanovic .......... G06F 16/9038 |
| | | 707/805 |
| 2016/0092557 A1* | 3/2016 | Stojanovic ............ G06F 16/248 |
| | | 707/723 |
| 2017/0017760 A1 | 1/2017 | Freese et al. |
| 2017/0270435 A1 | 9/2017 | Gallardo |
| 2018/0373844 A1 | 12/2018 | Ferrandez-Escamez et al. |
| 2020/0350072 A1 | 11/2020 | McEwing et al. |
| 2020/0356900 A1* | 11/2020 | Briancon ............... G06N 20/20 |
| 2021/0012246 A1 | 1/2021 | Hazard |
| 2021/0090694 A1 | 3/2021 | Colley et al. |
| 2021/0241204 A1 | 8/2021 | Stein |
| 2021/0287080 A1 | 9/2021 | Moloney |
| 2022/0058749 A1 | 2/2022 | Gallardo et al. |

* cited by examiner

GRAPH BASED PREDICTIVE INFERENCES FOR DOMAIN TAXONOMY

BACKGROUND

Various embodiments of the present disclosure address technical challenges related to the generation of predictive inferences in robust predictive domains given limitations of existing classification techniques. Conventional classification techniques leverage broad taxonomies to group different entities within a predictive domain. Taxonomies may be used as a predictor or feature variable in the analysis, prediction, and reporting of entities within the predictive domain. For instance, taxonomies may include entity classes, such as taxonomy codes, that may be used to identify similar/dissimilar peer groups for use in generating predictive inferences. Traditionally, entities within a predictive domain may self-designate their taxonomy code which makes any solution premised on a taxonomy code susceptible to misclassification errors. Even if classified correctly, traditional taxonomies do not account for the high variance and heterogeneity in a predictive domain (e.g., such as clinical procedures that could potentially be rendered within any specific taxonomy or specialty) and therefore may be prone to information value degradation and misclassification errors. Various embodiments of the present disclosure make important contributions to various existing classification techniques by addressing each of these technical challenges.

BRIEF SUMMARY

Various embodiments of the present disclosure provide graph-based approaches for generating empirical domain taxonomies for different entity classes of a domain taxonomy. The empirical domain taxonomies may break down an entity class into multiple subclasses based on the homogenous behavior of a plurality of entities within the class. Each subclass is associated with a node cluster that may be compared to a graph representation of an entity's past behavior to accurately generate a granular predictive classification for the entity that is specifically tailored to the actual interactions of the entity. This granular predictive classification may be leveraged by machine learning models as an additional input and, in some cases, may be used to evaluate a machine learning model's performance with respect to subgroups within a population. By doing so, the present disclosure provides improved graph-based classification techniques that may be leveraged to overcome the technical challenges of conventional classification and prediction techniques for generating predictive inferences in robust predictive domains.

In some embodiments, a computer-implemented method includes generating, by one or more processors, a network graph for an entity class based on a plurality of interaction data objects corresponding to a plurality of entities of the entity class, wherein: (i) each of the plurality of interaction data objects comprises one or more interaction codes, (ii) the network graph comprises a plurality of nodes and a plurality of edges, (iii) a particular node of the plurality of nodes corresponds to a particular interaction code of at least one of the plurality of interaction data objects, (iv) a particular edge of the plurality of edges connects a node pair of the plurality of nodes that is associated with a particular interaction data object, (v) the particular node is associated with a node weight indicative of a code frequency of the particular interaction code in the plurality of interaction data objects, and (vi) the particular edge is associated with an edge weight indicative of a code pair frequency for two interaction codes corresponding to the node pair in the plurality of interaction data objects; generating, by the one or more processors, one or more node clusters based on the node weight and the edge weight; and generating, by the one or more processors, a class taxonomy for the entity class based on the one or more node clusters, wherein the class taxonomy is indicative of a plurality of homogenous subclasses of the entity class.

In some embodiments, a computing apparatus includes a memory and one or more processors communicatively coupled to the memory. The one or more processors may be configured to: generate a network graph for an entity class based on a plurality of interaction data objects corresponding to a plurality of entities of the entity class, wherein: (i) each of the plurality of interaction data objects comprises one or more interaction codes, (ii) the network graph comprises a plurality of nodes and a plurality of edges, (iii) a particular node of the plurality of nodes corresponds to a particular interaction code of at least one of the plurality of interaction data objects, (iv) a particular edge of the plurality of edges connects a node pair of the plurality of nodes that is associated with a particular interaction data object, (v) the particular node is associated with a node weight indicative of a code frequency of the particular interaction code in the plurality of interaction data objects, and (vi) the particular edge is associated with an edge weight indicative of a code pair frequency for two interaction codes corresponding to the node pair in the plurality of interaction data objects; generate one or more node clusters based on the node weight and the edge weight; and generate a class taxonomy for the entity class based on the one or more node clusters, wherein the class taxonomy is indicative of a plurality of homogenous subclasses of the entity class.

In some embodiments, one or more non-transitory computer-readable storage media includes instructions that, when executed by one or more processors, cause the one or more processors to: generate a network graph for an entity class based on a plurality of interaction data objects corresponding to a plurality of entities of the entity class, wherein: (i) each of the plurality of interaction data objects comprises one or more interaction codes, (ii) the network graph comprises a plurality of nodes and a plurality of edges, (iii) a particular node of the plurality of nodes corresponds to a particular interaction code of at least one of the plurality of interaction data objects, (iv) a particular edge of the plurality of edges connects a node pair of the plurality of nodes that is associated with a particular interaction data object, (v) the particular node is associated with a node weight indicative of a code frequency of the particular interaction code in the plurality of interaction data objects, and (vi) the particular edge is associated with an edge weight indicative of a code pair frequency for two interaction codes corresponding to the node pair in the plurality of interaction data objects; generate one or more node clusters based on the node weight and the edge weight; and generate a class taxonomy for the entity class based on the one or more node clusters, wherein the class taxonomy is indicative of a plurality of homogenous subclasses of the entity class.

In some embodiments, a computer-implemented method includes generating, by one or more processors, an entity network graph for an entity based on a plurality of interaction data objects for the entity, wherein: (i) each of the plurality of interaction data objects comprises one or more interaction codes, (ii) the entity network graph comprises a plurality of nodes and a plurality of edges, (iii) a particular node of the plurality of nodes corresponds to a particular interaction code of at least one of the plurality of interaction data objects, (iv) a particular edge of the plurality of edges connects a node pair of the plurality of nodes that is associated with a particular interaction data object, (v) the particular node is associated with a node weight indicative of a code frequency in the plurality of interaction data objects, and (vi) the particular edge is associated with an edge weight indicative of a code pair frequency in the plurality of interaction data objects; identifying, by the one or more processors, a class network graph based on an entity class corresponding to the entity; and generating, by the one or more processors, a predictive classification for the entity based on a comparison between the class network graph and the entity network graph.

In some embodiments, a computing apparatus includes a memory and one or more processors communicatively coupled to the memory. The one or more processors may be configured to: generate an entity network graph for an entity based on a plurality of interaction data objects for the entity, wherein: (i) each of the plurality of interaction data objects comprises one or more interaction codes, (ii) the entity network graph comprises a plurality of nodes and a plurality of edges, (iii) a particular node of the plurality of nodes corresponds to a particular interaction code of at least one of the plurality of interaction data objects, (iv) a particular edge of the plurality of edges connects a node pair of the plurality of nodes that is associated with a particular interaction data object, (v) the particular node is associated with a node weight indicative of a code frequency in the plurality of interaction data objects, and (vi) the particular edge is associated with an edge weight indicative of a code pair frequency in the plurality of interaction data objects; identify a class network graph based on an entity class corresponding to the entity; and generate a predictive classification for the entity based on a comparison between the class network graph and the entity network graph.

In some embodiments, one or more non-transitory computer-readable storage media includes instructions that, when executed by one or more processors, cause the one or more processors to: generate an entity network graph for an entity based on a plurality of interaction data objects for the entity, wherein: (i) each of the plurality of interaction data objects comprises one or more interaction codes, (ii) the entity network graph comprises a plurality of nodes and a plurality of edges, (iii) a particular node of the plurality of nodes corresponds to a particular interaction code of at least one of the plurality of interaction data objects, (iv) a particular edge of the plurality of edges connects a node pair of the plurality of nodes that is associated with a particular interaction data object, (v) the particular node is associated with a node weight indicative of a code frequency in the plurality of interaction data objects, and (vi) the particular edge is associated with an edge weight indicative of a code pair frequency in the plurality of interaction data objects; identify a class network graph based on an entity class corresponding to the entity; and generate a predictive classification for the entity based on a comparison between the class network graph and the entity network graph.

DETAILED DESCRIPTION

Figure 1:
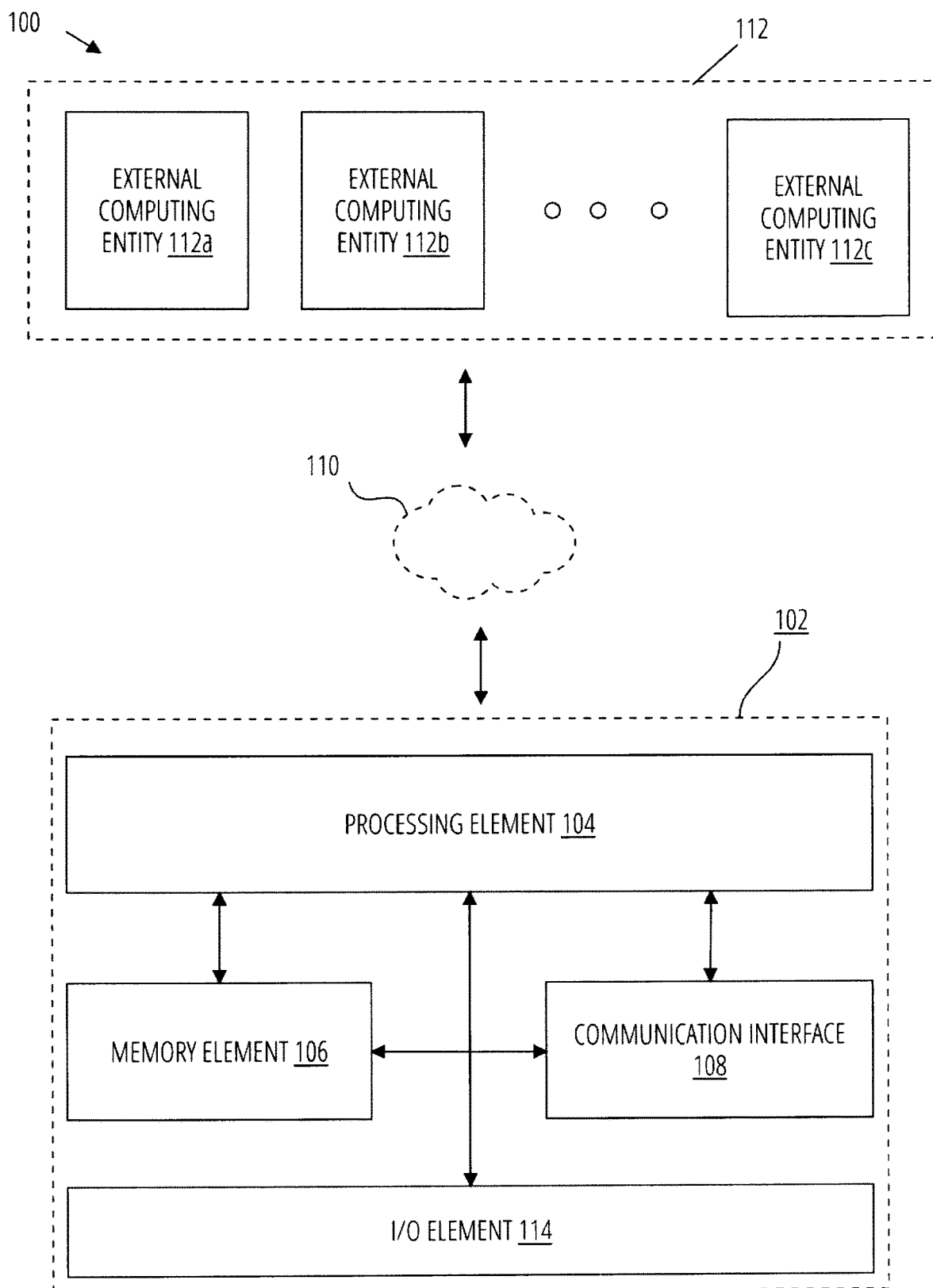
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 illustrates an example computing system 100 in accordance with one or more embodiments of the present disclosure. The computing system 100 may include a predictive computing entity 102 and/or one or more external computing entities 112*a-c* communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., segmentation techniques, classification techniques, graph generation techniques, predictive classification techniques, and/or the like) described herein.

The external computing entities 112a-c, for example, may include and/or be associated with one or more data centers, call centers, and/or any other external entity that may be configured to receive, store, and/or interpret interaction data objects, such as medical claims in clinical domain. The data centers, for example, may be associated with one or more data repositories storing interaction data and/or the like that can, in some circumstances, be processed by the predictive computing entity 102 to generate network graphs and/or one or more predictive classifications. In some embodiments, one or more of the external computing entities 112a-c may include one or more data processing entities that may receive, store, and/or have access to evaluation data for one or more machine learning models. The data processing entities, for example, may maintain a training datastore with a plurality of labeled interaction data objects, and/or the like.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
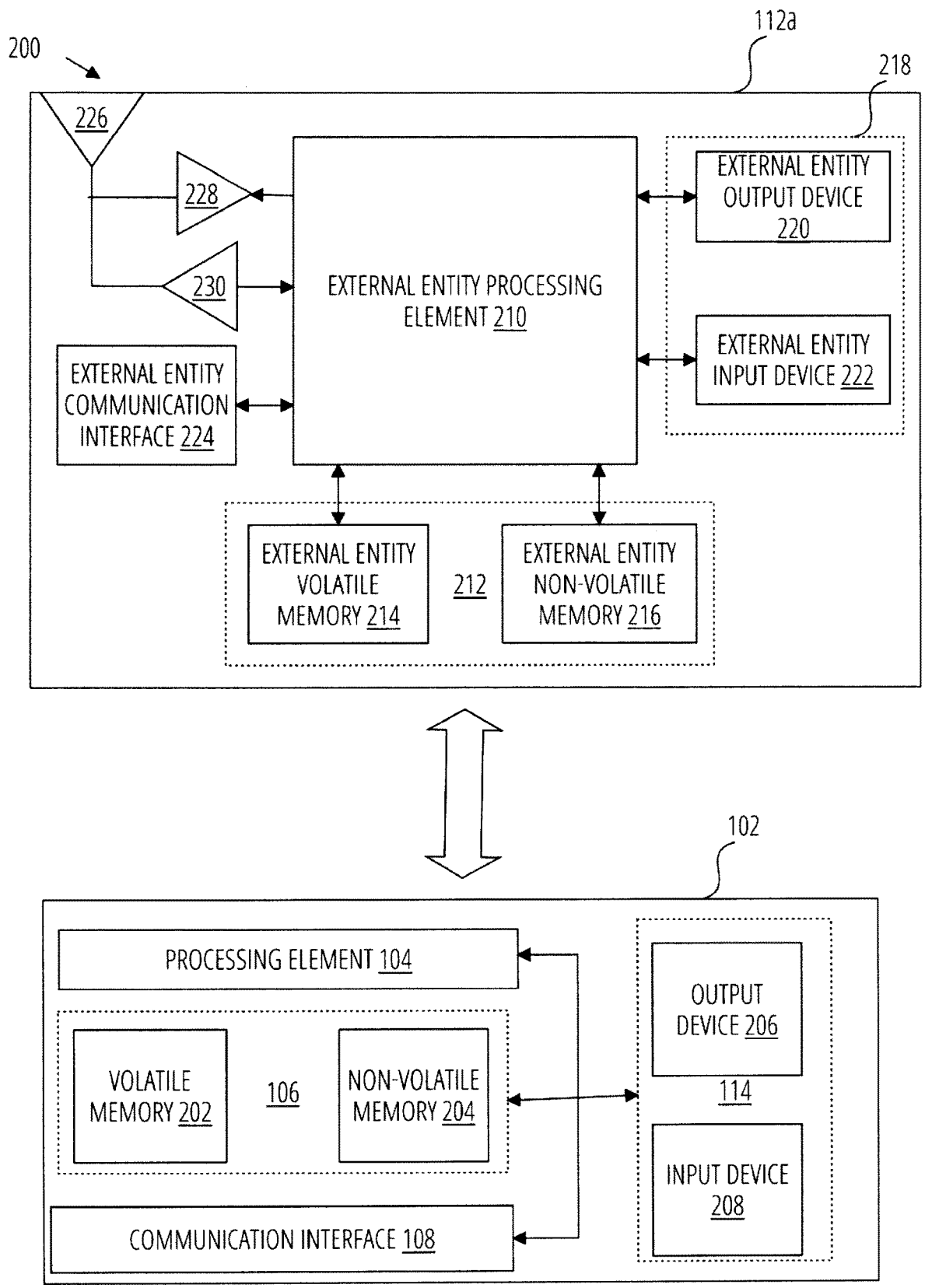
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user.

The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. EXAMPLES OF CERTAIN TERMS

In some embodiments, the term "domain taxonomy" refers to a data structure for classifying a plurality of different entities within a predictive domain. For example, the domain taxonomy may include a classification taxonomy for a plurality of entities that operate within and/or are otherwise associated with the predictive domain. The domain taxonomy, for instance, may define a plurality of entity classes that may be assigned to the plurality of entities to group the entities into general categories. In some examples, this may be done to facilitate predictions for the entities. A domain taxonomy may be applied to any type of entity in any context in which the entity may be differentiated from other entities based on one or more characteristics. The type, number, formatting, and/or the like of the plurality of entity classes may depend on the predictive domain. As one example, in a clinical domain, the domain taxonomy may include a clinical provider taxonomy for classifying a plurality of clinical providers to help categorize the clinical providers based on different characteristics.

In some embodiments, the term "entity" refers to a data entity that represents a participant in a predictive domain. An entity, for example, may include a number, profile, name, and/or any other data value configured to represent an individual that operates in the predictive domain. The entity may depend on the predictive domain. As one example, in a clinical domain, the entity may represent a clinical provider that is associated with a plurality of medical claims. The clinical provider may be associated with a profile, a name, a unique identifier, and/or the like that may represent the provider. In some examples, the entity representing a clinical provider may include a National Provider Identifier (NPI) for the provider.

In some embodiments, the term "entity class" refers to an individual data value of a domain taxonomy. The entity class may include a code, label, and/or the like that may be assigned to an entity of a predictive domain, in some examples, to facilitate predictions for the entity. The entity class may depend on the domain taxonomy and/or predictive domain. In some examples, in a clinical domain, an entity class may include a taxonomy code that may be used to identify similar and/or dissimilar clinical provider groups.

In some embodiments, the term "domain empirical taxonomy" refers to a data structure for empirically classifying a plurality of different entities within a predictive domain based on behavior patterns of the entities. A domain empirical taxonomy may include a class taxonomy for each entity class of a domain taxonomy. Each class taxonomy may define a plurality of sub-classes for an entity class that are tailored to the actual activities of the plurality of entities within the entity class. Each sub-class may correspond to a fine-grained entity subclass label for an entity that offers a greater level detail relative to the entity class. In some examples, a respective class taxonomy may correspond to a respective network graph. As described herein, each entity subclass label may correspond to a portion of a respective network graph.

In some embodiments, the term "network graph" refers to a data structure that represents behavioral patterns for one or more entities within a predictive domain. In some examples, the behavioral patterns may be based on interaction data object for the plurality of entities. The network graph, for example, may include a graph-based structure that defines a plurality of nodes and edges representing one or more attributes of a plurality of interaction data objects. By way of example, each node may represent a particular attribute, such as an interaction code, that may be included in at least one of the interaction data objects. As another example, each edge may connect nodes respectively corresponding to two attributes (e.g., interaction codes, etc.) that are included in a single interaction data object. In some examples, the nodes and edges may be weighted based on a frequency of occurrences of their respective attributes within a plurality of interaction data objects.

In some embodiments, the term "interaction data object" refers a data entity that represents a recorded interaction corresponding to an entity within a predictive domain. The interaction data object may include a plurality of interaction attributes defining one or more characteristics of the recorded interaction. In some examples, the plurality of interaction attributes may include one or more interaction codes. The interaction data object, the interaction attributes, and/or the interaction codes may depend on the prediction domain. For example, in a clinical domain, an interaction data object may include a medical claim corresponding to (e.g., submitted by, listing, etc.) a clinical provider. The medical claim may include one or more interaction codes that describe medical codes, such as current procedural terminology (CPT) codes listed in the medical claim. In some examples, each node of a network graph may correspond to a medical code listed in a medical claim. By way of example, each CPT code present in a set of interaction data objects may be mapped to a unique and distinct node in a network graph. In some examples, each edge of a network graph may connect two nodes respectively corresponding to a pair of medical codes that are included in a single medical claim. By way of example, an edge between two nodes may indicate that a pair of CPT codes were billed together in one interaction data object.

In some embodiments, the term "node weight" refers to a data value that represents a frequency of an attribute corresponding to a node of a network graph. For example, a node weight may be indicative of a code frequency of the particular interaction code in the interaction data objects. In some examples, the node weight may be based on a code count. The code count may identify a number of the interaction data objects that include the particular interaction code. By way of example, in a clinical context, a node weight may be indicative of a frequency (e.g., degree, etc.) of which a CPT code mapped to node has been used across a plurality of medical claims for medical providers of an entity class. For instance, the node weight may be equal to a number of claims a corresponding CPT code was billed in.

In some embodiments, the term "edge weight" refers to a data value that represents a frequency of an attribute pair corresponding to two nodes connected by a respective edge of a network graph. For example, an edge weight may be indicative of code pair frequency of a node pair in the plurality of interaction data objects. In some examples, the node pair may correspond to a first interaction code and a second interaction code that are associated with the particular interaction data object. The edge weight may be based on a code pair count identifying a number of a plurality of interaction data objects that include the first interaction code and the second code interaction code. By way of example, in a clinical context, the weight of an edge between a first node and second node respectively corresponding to a pair of CPT codes may be a count of medical claims in which both of the pair of CPT codes are billed.

In some embodiments, the term "class network graph" refers to a network graph for an entity class of a domain taxonomy. The class network graph may include a plurality of class nodes and class edges that are based on a plurality of interaction data objects corresponding to the entity class. The class network graph may depend on the prediction domain. For example, in a clinical domain, the class network graph may be based on medical claims data that includes a plurality of historical medical claims submitted by one or more clinical providers within a clinical specialty (e.g., a specialty defined by the domain taxonomy).

In some embodiments, the term "entity network graph" refers to a network graph for an entity of a predictive domain. The entity network graph may include a plurality of entity nodes and entity edges that are based on a plurality of interaction data objects corresponding to the entity. The entity network graph may depend on the prediction domain. For example, in a clinical domain, the entity network graph may be based on medical claims data that includes a plurality of historical medical claims submitted by a particular clinical provider.

In some embodiments, the term "outlier node" refers to a node of a network graph that satisfies outlier criteria by differing from one or more of the nodes of the network graph. An outlier node, for example, may include a node weight that satisfies one or more node weight thresholds.

In some embodiments, the term "node weight threshold" refers to a data entity that defines one or more outlier criteria for a network graph. The node weight threshold may include a static and/or dynamic data entity that describes a value and/or value range for one or more node weights. In some examples, a node weight threshold may include first weight threshold and/or a second weight threshold that define a weight range for the plurality of nodes. In some examples, a node weight threshold may include a predefined, static value independent of the plurality of node weights for a network graph. In addition, or alternatively, a node weight threshold may include a dynamic value that is tailored to the node weights for a network graph. By way of example, a node weight threshold may define a weight range that may include a three-sigma range from an average node weight of the network graph.

In some embodiments, the term "relevant network graph" refers to a refined network graph. The relevant network graph may include a network graph that has been refined to remove one or more outlier nodes.

In some embodiments, the term "nodal community" refers to a subset of related nodes from a network graph. For example, the plurality of nodes may be divided into the one or more nodal communities. Each nodal community may include a different subset of the plurality of nodes. The plurality of related nodes of each respective nodal community may be detected using a community detection model.

In some embodiments, the term "community detection model" refers to a data entity that describes parameters, hyper-parameters, and/or defined operations of a rules-based algorithm, machine learning model (e.g., model including at least one of one or more rule-based layers, one or more layers that depend on trained parameters, coefficients, and/or the like), and/or the like. In some examples, the community detection model may include a graph community detection algorithm, such as Girvan-Newman, and/or the like. The community detection model may be configured to process the relevant network graph to assign a community classification to each node of the graph network.

In some embodiments, the term "community cutoff threshold" refers to a data entity that defines one or more community criteria for a network graph. A community cutoff threshold may define one or more threshold edge weights between the nodes of a nodal community. By way of example, a community cutoff threshold for a nodal community may include a threshold edge weight that defines (i) a minimum edge weight for each of a plurality of internal edges respectively connecting two nodes within the nodal community and/or (ii) a maximum edge weight for each of a plurality of external edges respectively connecting an internal node within the nodal community and an external node outside of the nodal community.

The community cutoff threshold may include a static and/or dynamic data entity that describes a value and/or value range for one or more edge weights. In some examples, a community cutoff threshold may include a predefined, static value independent of the plurality of edge weights for a nodal community. In addition, or alternatively, the community cutoff threshold may be based on an intersection between (i) a first distribution of edge weights for each of the plurality of internal edges and/or (ii) a second distribution of edge weights for each of the plurality of external edges.

In some embodiments, the term "node cluster" refers to a subset of aligned nodes of the network graph that are associated with a nodal community. A node cluster may include a plurality of aligned nodes that are associated with a nodal community. The plurality of aligned nodes may be grouped together and separated from one or more other nodes of the network graph to define one or more community segments between nodal communities of the network graph.

In some embodiments, the term "class taxonomy" refers to data entity that describes a portion of an entity class. For example, the class taxonomy may include an entity subclass label of an entity class.

In some embodiments, the term "predictive classification" refers to a data entity that describes a predictive output for a predictive domain. The predictive classification may depend on the predictive domain. In some examples, the predictive classification may include a predictive sublabel for an entity of the predictive domain. By way of example, in a clinical context, a predictive classification may include a predicted subclass label for an entity class defined by the clinical provider taxonomy.

In some embodiments, the term "overlap score" refers to a data value that describes a similarity between an entity network graph of a node cluster of a class network graph. For example, the overlap score may be determined based on an overlap between the entity nodes of an entity network graph and the class nodes of a node cluster of a class network graph. By way of example, the overlap score may be measured in terms of the sum of degrees of the nodes common to the entity network graph and a node cluster of the network graph. As described herein, each particular node cluster of a class network graph may correspond to the predictive classification. In some examples, an entity may be assigned a predictive classification corresponding to a node cluster associated with a highest overlap score relative to the other node clusters in the class network graph.

In some embodiments, the term "machine learning model" refers to a data entity that describes parameters, hyper-parameters, and/or defined operations of a rules-based algorithm, machine learning model (e.g., model including at least one of one or more rule-based layers, one or more layers that depend on trained parameters, coefficients, and/or the like), and/or the like. The machine learning model may be configured to process one or more interaction data objects for an entity to generate a prediction, classification, and/or any other machine learning output for characterizing the entity and/or a group of entities within a predictive domain.

In some embodiments, the term "evaluation metric" refers to a performance metric for a machine learning model. The evaluation metric may include any type of measurement configured to evaluate the performance of a model. For example, the evaluation metric may include a true positive rate (TPR), a false positive rate (FPR), and/or any other evaluation measurement for a machine learning model. In some examples, the evaluation metric may be indicative of a performance of a machine learning model with respect to a particular set of data. For instance, an evaluation metric may be indicative of a performance of a machine learning model with respect to interaction data objects and/or entities corresponding to a predictive classification. For instance, one or more evaluation metrics may include an evaluation metric corresponding to each of one or more node clusters of a class network graph. Each of the one or more evaluation metrics may include a TPR for the machine learning model relative to a plurality of historical entities associated with a predictive classification corresponding to respective node cluster. In some examples, one or more evaluation metrics may be compared to determine a relative performance of the machine learning model with respect to each of a plurality of prediction classifications.

IV. OVERVIEW, TECHNICAL IMPROVEMENTS, AND TECHNICAL ADVANTAGES

Embodiments of the present disclosure present graph-based techniques that improve predictive classifications for entities within a predictive domain. The predictive classifications may be leveraged to improve traditional machine learning predictions and other data analysis techniques for entities within the prediction domain by providing more granular insights into the actual activities of the entities. To do so, some embodiments of the present disclosure describe a graph-based empirical taxonomy for classifying entities, such as clinical providers within a clinical domain, by detecting homogenous entity behaviors between subgroups of the plurality of entities. The subgroups may be detected for each class of a traditional taxonomy to segment a traditionally broad, obscure, and vague class into smaller, more granular, and detailed homogenous empirical taxonomies. These class taxonomies may provide predictive insights for each entity within a predictive domain that may be leveraged as an additional input by machine learning models to improve model performance.

A class taxonomy may be generated using a new network graph architecture with nodes and edges that define various behavioral attributes for entities within a traditional entity class. The nodes and edges of the network graph architecture may be weighted to facilitate community detection and clustering techniques for segmenting the network graph into various node clusters. Each node cluster may be assigned an entity subclass label that may be used to classify an entity into one or more different behavior-based subgroups within the entity class. In this way, the graph-based empirical taxonomy techniques of the present disclosure may account for the high variance and/or heterogeneity in interactions that may be performed across entity classes of a traditional domain taxonomy.

In addition, some embodiments of the present disclosure present predictive techniques for predicting a subclass label for an entity based on the entity's behavioral patterns. To do so, a network graph may be generated for the entity using the entity's historical interactions. The network graph may include a plurality of nodes and edges that may be directly compared to the nodes and edges of the various node clusters defined in a network graph for a specific entity class. An overlap between the entity's network graph and each node cluster of the entity class's network graph may be used to accurately predict which subclass of a plurality of subclasses correspond to the entity. In this way, the predictive techniques of the present disclosure may facilitate the accurate classification and segmentation of various entities within a prediction domain in a manner that is not susceptible to information value degradation and/or misclassification errors.

Example inventive and technologically advantageous embodiments of the present disclosure include: (i) graph-based network architectures; (ii) data segmentation techniques for leveraging the graph-based network architectures to generate predictive classifications; and/or (iii) machine learning evaluation techniques for evaluation machine learning model performance with respect to different portions of data.

V. EXAMPLE SYSTEM OPERATIONS

As indicated, various embodiments of the present disclosure make important technical contributions to data segmentation and prediction techniques for robust prediction domains. In particular, systems and methods are disclosed herein that implement graph-based techniques for segmenting a robust, general, entity class into multiple finely-tuned, behavior-based subgroups. Each subgroup may be assigned a label and may be associated with a graph-based node cluster that may be leveraged to accurately assign the label to other entities within a population. These new labels may be used as additional inputs to machine learning models to improve and evaluate model performance.

Figure 3:
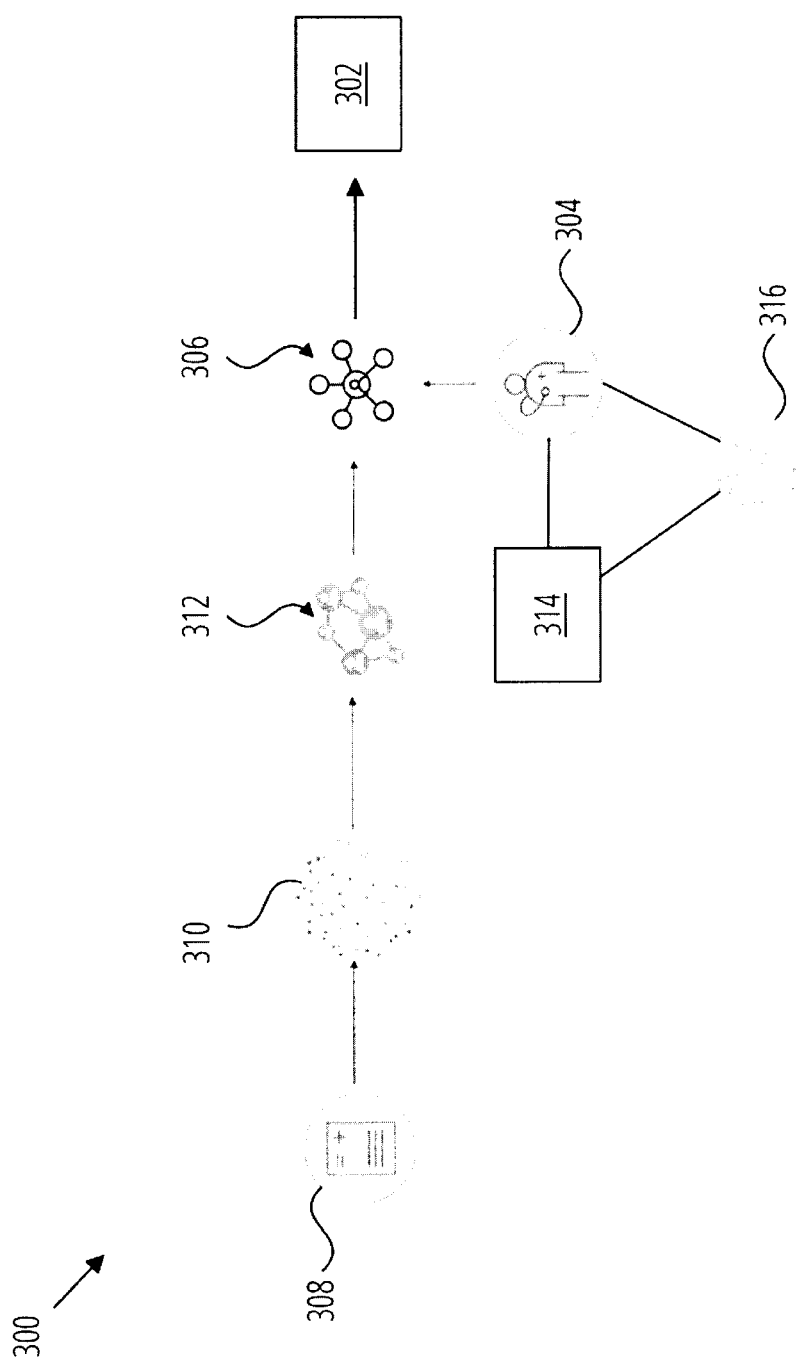
FIG. 3 is a dataflow diagram showing example data structures for generating graph-based predictive inferences in accordance with some embodiments discussed herein.

FIG. 3 is a dataflow diagram 300 showing example data structures for generating graph-based predictive inferences in accordance with some embodiments discussed herein. The dataflow diagram 300 depicts a set of data structures and modules for generating empirical class taxonomies for entity classes of a domain taxonomy. As described herein, the empirical class taxonomies may be leveraged to generate granular predictive classifications for entities that operate within a predictive domain.

As described herein, a predictive classification 302 for an entity 304 may describe a granular representation of an entity 304 based on the historical interactions performed by the entity within a predictive domain. The predictive classification 302 may be a subclass within an entity class previously defined by a domain taxonomy. Unlike the traditional entity classes of a domain taxonomy, the predictive classification 302 may be automatically generated for the entity 304 and directly tailored to the actual interactions of entity 304.

In some embodiments, a domain taxonomy is a data structure for classifying a plurality of different entities within a predictive domain. For example, the domain taxonomy may include a classification taxonomy for a plurality of entities that operate within and/or are otherwise associated with the predictive domain. The domain taxonomy, for instance, may define a plurality of entity classes that may be assigned to and/or selected by the plurality of entities to group the entities into general categories. In some examples, this may be done to facilitate predictions for the entities. A domain taxonomy may be applied to any type of entity in any context in which the entity may be differentiated from other entities based on one or more characteristics. The type, number, formatting, and/or the like of the plurality of entity classes may depend on the predictive domain. As one example, in a clinical domain, the domain taxonomy may include a clinical provider taxonomy for classifying a plurality of clinical providers to help categorize the clinical providers based on different characteristics.

In some embodiments, the entity 304 is a data entity that represents a participant in a predictive domain. An entity 304, for example, may include a number, profile, name, and/or any other data value configured to represent an individual that operates in the predictive domain. The entity 304 may depend on the predictive domain. As one example, in a clinical domain, the entity 304 may represent a clinical provider that is associated with a plurality of medical claims. The clinical provider may be associated with a profile, a name, a unique identifier, and/or the like that may represent the provider. In some examples, the entity 304 representing a clinical provider may include a National Provider Identifier (NPI) for the provider.

The domain taxonomy for the predictive domain may include a plurality of entity classes for grouping one or more entities that operate within the predictive domain. In some embodiments, each entity class is an individual data value of a domain taxonomy. The entity class may include a code, label, and/or the like that may be assigned to the entity 304 of a predictive domain, in some examples, to facilitate predictions for the entity 304. The entity class may depend on the domain taxonomy and/or predictive domain. In some examples, in a clinical domain, an entity class may include a taxonomy code that may be used to identify similar and/or dissimilar clinical provider groups.

In some embodiments of the present disclosure, an entity class of a domain taxonomy is broken down into an empirical class taxonomy 306 that includes a plurality of granular subclasses for the entity class. The class taxonomy 306 may be generated based on interaction data indicative of the historical behaviors of a plurality of entities within the predictive domain that are previously assigned to the entity class. As one example, the interaction data may include a plurality of interaction data objects 308.

In some embodiments, the interaction data objects 308 include data entities that represent a recorded interaction corresponding to one or more entities within a predictive domain. The interaction data objects 308 may include a plurality of interaction attributes defining one or more characteristics of the recorded interaction. In some examples, the plurality of interaction attributes may include one or more interaction codes. The interaction data objects 308, the interaction attributes, and/or the interaction codes may depend on the prediction domain. For example, in a clinical domain, the interaction data objects 308 may include medical claims corresponding to (e.g., submitted by, listing, etc.) one or more clinical providers. The medical claim may include one or more interaction codes that describe medical codes, such as, current procedural terminology (CPT) codes listed in the medical claim.

In the dataflow diagram 300, the interaction data objects 308 may include a plurality of interaction data objects 308 for a plurality of entities that are previously associated with a respective entity class of a domain taxonomy. In a clinical context, for example, the interaction data objects 308 may include claims data representing a plurality of medical claims submitted by clinical providers classified with a particular class in a clinical taxonomy.

The class taxonomy 306 for the entity class may be based on a network graph 310 derived from the interaction data objects 308. For example, the network graph 310 may be generated for the entity class based on the plurality of interaction data objects 308 corresponding to a plurality of entities of the entity class.

In some embodiments, a network graph 310 is a data structure that represents behavioral patterns for one or more entities within a predictive domain. In some examples, the behavioral patterns may be based on interaction data objects 308 for a plurality of entities. The network graph 310, for example, may include a graph-based structure that defines a plurality of nodes and edges representing one or more attributes of a plurality of interaction data objects 308. By way of example, each node may represent a particular attribute, such as an interaction code, that may be included in at least one of the interaction data objects 308. As another example, each edge may connect nodes respectively corresponding to two attributes (e.g., interaction codes, etc.) that are included in a single interaction data object. In some examples, the nodes and edges may be weighted based on a frequency of occurrences of their respective attributes within a plurality of interaction data objects.

In some examples, each of the interaction data objects 308 may include one or more interaction codes. The network graph 310 may include a plurality of nodes and a plurality of edges. A particular node of the plurality of nodes may correspond to a particular interaction code of at least one of the plurality of interaction data objects 308. A particular edge of the plurality of edges may connect a node pair of the plurality of nodes that are associated with a particular interaction data object. In some examples, for instance, in a clinical domain, each node of the network graph 310 may correspond to a medical code listed in a medical claim. By way of example, each CPT code present in a set of interaction data objects 308 may be mapped to a unique and distinct node in the network graph 310. In some examples, each edge of a network graph 310 may connect two nodes respectively corresponding to a pair of medical codes that are included in a single medical claim. By way of example, an edge between two nodes may indicate that a pair of CPT codes were billed together in one of the interaction data objects 308.

A particular node may be associated with a node weight that identifies a code frequency of the particular interaction code in the plurality of interaction data objects 308. In some embodiments, a node weight is a data value that represents a frequency of an attribute corresponding to a node of the network graph 310. For example, a node weight may be indicative of a code frequency of the particular interaction code in the interaction data objects 308. In some examples, the node weight may be based on a code count. The code count may identify a number of the interaction data objects 308 that include the particular interaction code. By way of example, in a clinical context, a node weight may be indicative of a frequency (e.g., degree, etc.) of which a CPT code mapped to node has been used across a plurality of medical claims for medical providers if an entity class. For instance, the node weight may be equal to a number of claims a corresponding CPT code was billed in.

A particular edge may be associated with an edge weight indicative of code pair frequency of a node pair in the plurality of interaction data objects 308. In some embodiments, an edge weight is a data value that represents a frequency of an attribute pair corresponding to two nodes connected by a respective edge of a network graph. For example, an edge weight may be indicative of code pair frequency of a node pair in the interaction data objects 308. In some examples, the node pair may correspond to a first interaction code and a second interaction code that are associated with the particular interaction data object. The edge weight may be based on a code pair count identifying a number of interaction data objects 308 that include the first interaction code and the second code interaction code. By way of example, in a clinical context, the weight of an edge between a first node and second node respectively corresponding to a pair of CPT codes may be a count of medical claims in which both of the pair of CPT codes are billed.

In some embodiments, the network graph 310 is processed to generate one or more node clusters 312 that represent one or more groups of related interaction codes. For instance, the node clusters 312 may be generated based on the node weights and edge weights for each of the nodes/edges of the network graph 310.

In some embodiments, the node clusters 312 include subsets of aligned nodes of the network graph 310 that are associated with one or more nodal communities of the network graph 310. A respective node cluster, for example, may include a plurality of aligned nodes that are associated with a respective nodal community. The plurality of aligned nodes may be grouped together and separated from one or more other nodes of the network graph 310 to define one or more community segments between nodal communities of the network graph 310.

In some embodiments, the node clusters 312 are generated from nodal communities generated for a relevant network graph. A relevant network graph may include the network graph 310 with one or more outlier nodes removed. For example, the one or more outlier nodes may be identified from the plurality of nodes of the network graph 310 based on the node weights for each of the node. The relevant network graph may be generated from the network graph 310 by removing the one or more outlier nodes from the network graph 310.

In some embodiments, one or more nodal communities are generated from the relevant network graph. For example, a community detection model may be applied to the relevant network graph to generate the one or more nodal communities. In some examples, the one or more node clusters 312 may be generated by aligning the plurality of nodes based on the one or more nodal communities.

In some embodiments, the class taxonomy 306 may be generated for entity class based on the node clusters 312. A class taxonomy may include a data entity that describes a portion of an entity class. For example, the class taxonomy may include one or more entity subclass labels for an entity class. By way of example, the class taxonomy may include a respective entity subclass label for each of the node clusters 312. The class taxonomy 306 may be indicative of a plurality of homogenous subclasses of the entity class. For example, the class taxonomy 306 may include an empirical taxonomy generated by detecting community structures within the network graph, such that the new entity subclass labels represent groups of entities that exhibit similar patterns of behavior within any entity class (e.g., stated specialty, etc.).

In some embodiments, a domain empirical taxonomy is generated for a domain taxonomy to provide granular, targeted, classifications for each entity class of the domain taxonomy. The domain empirical taxonomy may be generated based on the network graph 310 and/or the class taxonomy 306. For example, a domain taxonomy for a predictive domain may include a plurality of entity classes. The domain empirical taxonomy may include a respective class taxonomy for each of the plurality of entity classes. Each class taxonomy may correspond to a respective network graph.

In some embodiments, the domain empirical taxonomy is stored in one or more memory devices. For example, the domain empirical taxonomy may be stored and later leveraged to perform one or more classifications, predictions, and/or any other tasks for a predictive domain. In some examples, the domain empirical taxonomy may be leveraged to generate a predictive classification 302 for the entity 304. In some examples, the domain empirical taxonomy may be provided for use in generating the predictive classification 302. By way of example, the domain empirical taxonomy may be stored in an accessible memory (e.g., one or more cloud servers, etc.) accessible by one or more third parties. As another example, the domain empirical taxonomy may be provided to the one or more third parties for classifying the entity 304.

In some embodiments, the predictive classification 302 is a data entity that describes a predictive output for a predictive domain. The predictive classification 302 may depend on the predictive domain. In some examples, the predictive classification 302 may include a predictive entity subclass label. By way of example, in a clinical context, the predictive classification 302 may include a predicted entity subclass label for a clinical class defined by a clinical provider taxonomy.

In some embodiments, the predictive classification 302 is generated based on the network graphs for each entity class of a domain taxonomy. For example, the predictive classification 302 may be generated based on the node clusters 312 of the network graph 310. By way of example, a separate network graph may be generated for each entity class of a domain taxonomy as well as the entity 304 within the predictive domain. Each network graph may be generated based on a plurality of interaction data objects corresponding to the entity and/or entity class. For example, the network graph 310 may include a class network graph that is generated based on the plurality of interaction data objects 308 that correspond to a plurality of entities associated with a particular entity class. Another network graph, such as the entity network graph 316, may be generated for the entity 304 based on a plurality of entity interaction data objects 314 that correspond to the entity 304. The entity interaction data objects 314, for example, may include interaction data objects that are associated with the entity 304. In a clinical context, for example, the entity interaction data objects 314 may include a plurality of medical claims that are billed by a particular clinical provider.

In some embodiments, a class network graph is a network graph for an entity class of a domain taxonomy. The class network graph may include a plurality of class nodes and class edges that are based on a plurality of interaction data objects corresponding to the entity class. The class network graph may depend on the prediction domain. For example, in a clinical domain, the class network graph may be based on medical claims data that includes a plurality of historical medical claims submitted by one or more clinical providers within a clinical specialty (e.g., a specialty defined by the domain taxonomy).

In some embodiments, the entity network graph 316 is a network graph for an entity of a predictive domain. The entity network graph may include a plurality of entity nodes and entity edges that are based on a plurality of interaction data objects corresponding to the entity. The entity network graph may depend on the prediction domain. For example, in a clinical domain, the entity network graph may be based on medical claims data that includes a plurality of historical medical claims submitted by a particular clinical provider.

In some embodiments, the entity network graph 316 is generated for the entity 304 based on a plurality of entity interaction data objects 314 for the entity 304. Each of the entity interaction data objects 314 may include one or more interaction codes. The entity network graph 316 may include a plurality of entity nodes and a plurality of entity edges. Each entity node may correspond to a particular interaction code of at least one of the plurality of entity interaction data objects 314. Each entity edge may connect an entity node pair of the plurality of entity nodes that are associated with a particular interaction data object. The entity nodes may each be associated with a respective node weight indicative of a code frequency in the plurality of entity interaction data objects 314. The entity edges may each be associated with an edge weight indicative of a code pair frequency in the plurality of entity interaction data objects 314.

In some embodiments, a class network graph is identified from a domain empirical taxonomy based on the entity 304. For example, the entity 304 may be associated with an entity class of a corresponding domain taxonomy. The class network graph may be identified based on the entity class. By way of example, the class network graph may include a network graph from the domain empirical taxonomy that corresponds to the entity class. The class network graph may be identified by receiving the domain empirical taxonomy for the domain taxonomy associated with the entity class. And selecting the class network graph from the domain empirical taxonomy. In some examples, the domain empirical taxonomy may be generated, stored, and then leveraged by one party (e.g., a first party). In addition, or alternatively, the domain empirical taxonomy may be generated by a third party and then provided to the first party for generating the predictive classification 302.

In some embodiments, the predictive classification 302 for the entity 304 is based on a comparison between the class network graph and the entity network graph 316. For example, one or more overlap scores between the class network graph and the entity network graph 316 may be determined. The one or more overlap scores, for example, may include a respective overlap score for each of the one or more node clusters 312 of the class network graph.

In some embodiments, an overlap score is a data value that describes a similarity between an entity network graph 316 a node cluster of a class network graph. For example, the overlap score may be determined based on an overlap between the entity nodes of an entity network graph 316 and the class nodes of a node cluster of a class network graph. By way of example, the overlap score may be measured in terms of the sum of degrees of the nodes common to the entity network graph 316 and a node cluster of the network graph. As described herein, each particular node cluster of a class network graph may correspond to a predictive classification. In some examples, the entity 304 may be assigned to the predictive classification 302 corresponding to a node cluster associated with a highest overlap score relative to the other node clusters in the class network graph.

In some embodiments, the one or more entity nodes are identified from the entity network graph 316 that correspond to a subset of the plurality of class nodes belonging to a respective node cluster. A particular overlap score may be determined between the entity 304 and the respective node cluster based on an aggregation of a respective node weight for each of the one or more identified entity nodes. This may be performed for each node cluster of a class network graph to determine the one or more overlap scores. A particular node cluster from the one or more node clusters may be identified based on the one or more overlap scores. By way of example, the overlap score for the particular node cluster may be the highest overlap score relative to the one or more other overlap scores.

In some embodiments, the predictive classification 302 is generated based on the particular node cluster. For example, the particular node cluster may correspond to the predictive classification 302. The predictive classification 302, for example, may include an entity subclass label corresponding to the particular node cluster. In some examples, the entity subclass label may be assigned to the entity 304.

Among other technical benefits, the predictive classification 302 may be leveraged to improve predictions for entities of a predictive domain. For example, the predictive classification 302 may be used as an additional input for machine learning models. In some examples, machine learning models may be individually trained using subsets of training data associated with entity subclass label to tailor the predictions of the models to specific behavior patterns of group of entities. This results in improved machine learning model performance by curating specific training datasets for each of a plurality of differentiable subgroups within an entity class defined by a domain taxonomy. In some embodiments, a machine learning model may be selected for the entity 304 based on the predictive classification 302. The machine learning model, for example, may be selected based on the predictive classification 302 and/or one or more evaluation metrics for the machine learning model.

In some embodiments, a machine learning model is evaluated based on the predictive classification. For example, one or more evaluation metrics may be generated for the machine learning model. Each evaluation metric may correspond to a predictive classification 302, a node cluster of the network graph 310, an entity subclass label, and/or the like.

In some embodiments, the machine learning model is a data entity that describes parameters, hyper-parameters, and/or defined operations of a rules-based algorithm, machine learning model (e.g., model including at least one of one or more rule-based layers, one or more layers that depend on trained parameters, coefficients, and/or the like), and/or the like. The machine learning model may be configured to process one or more interaction data objects for an entity to generate a prediction, classification, and/or any other machine learning output for characterizing the entity and/or a group of entities within a predictive domain.

In some embodiments, an evaluation metric is a performance metric for a machine learning model. The evaluation metric may include any type of measurement configured to evaluate the performance of a model. For example, the evaluation metric may include a true positive rate (TPR), a false positive rate (FPR), and/or any other evaluation measurement for a machine learning model. In some examples, the evaluation metric may be indicative of a performance of a machine learning model with respect to a particular set of data. For instance, an evaluation metric may be indicative of a performance of a machine learning model with respect to interaction data objects and/or entities corresponding to a predictive classification (e.g., an entity subclass label, etc.). For instance, one or more evaluation metrics may include an evaluation metric corresponding to each of the one or more node clusters 312 of a network graph 310. In some examples, each of the one or more evaluation metrics may include a TPR for the machine learning model relative to a plurality of historical entities associated with an entity subclass label corresponding to a respective node cluster. In some examples, one or more evaluation metrics may be compared to determine a relative performance of the machine learning model with respect to each of a plurality of prediction classifications.

Using the evaluation metrics, a machine learning model may be intelligently leveraged to process particular entities from a plurality of entities within a resource constrained predictive domain. For example, a data science model may perform differently and have different evaluation metrics, such TPR, and/or the like, for different sections of population space. By dividing the entire population space into communities based on the entity subclass labels described herein, a machine learning model may be individually evaluated with respect to each section of the population space. The overall performance of the model may be improved by prioritizing entities corresponding to an entity subclass label with the highest evaluation metrics.

An example of a network graph (e.g., entity network graph, class network graph, etc.) will now further be described with reference to FIG. 4.

Figure 4:
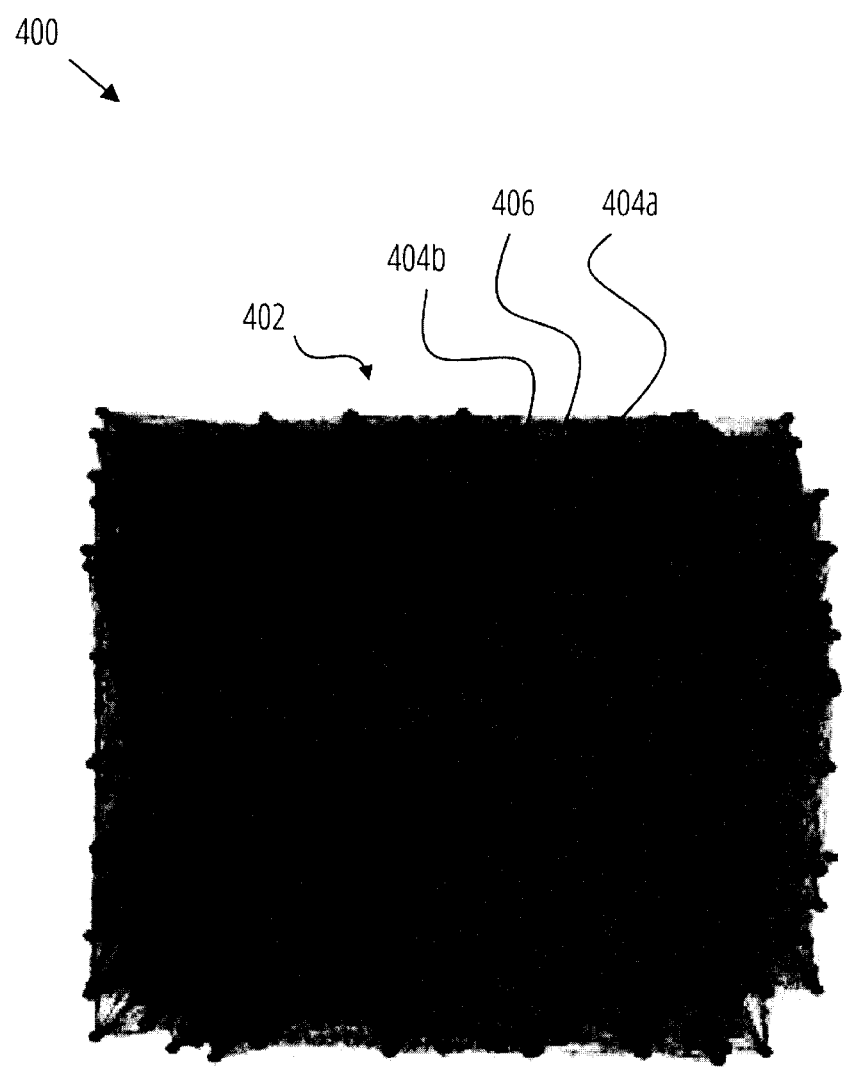
FIG. 4 is an operational example of a network graph in accordance with some embodiments discussed herein.

FIG. 4 is an operational example 400 of a network graph in accordance with some embodiments discussed herein. The operational example 400 is an example of an unrefined network graph 402. The unrefined network graph 402 may include a plurality of nodes 404*aa-b* and edges 406 as described herein.

By way of example, the network graph 402 may be represented by N(A,E) with a node set A and an edge set B. $e_{ab}$ may represent an edge between a first node 404*a* (denoted as a) and a second node 404*b* (denoted as b). W($e_{ab}$) may represent an edge weight for the edge 406. D(a) may represent a degree of the first node 404*a*, a. For example, D(a) may represent the node weight for the first node 404*a*, a.

D may represent the interaction data objects for the network graph 402. For example, the network graph 402 may be a class network graph and/or an entity network graph. In the event that the network graph 402 is a class network graph, the interaction data objects, D, may include a plurality of historical interaction data objects (e.g., medical claims in a clinical domain, etc.) that correspond (e.g., submitted, billed, etc.) to one or more entities of an entity class defined by a domain taxonomy. As another example, in the event that the network graph 402 is an entity network graph, the interaction data objects, D, may include a plurality of historical interaction data objects (e.g., medical claims in a clinical domain, etc.) that correspond (e.g., submitted, billed, etc.) to a particular entity of a predictive domain.

The dataset, D, of interaction data objects may be leveraged to create the network graph 402, N(A,E), by mapping each interaction code (e.g., CPT code, etc.) to a distinct node 404*a-b* of the network graph 402 and the node weight (e.g., degree, etc.) of the first node 404*a*, D(a), may be the number (e.g., code count, etc.) of interaction data objects (e.g., claims, etc.) in which a corresponding interaction code (e.g., a CPT code mapped to the first node, a, etc.) is present in (e.g., billed in, etc.). The edge weight, W(e ab), between the first node 404*a*, a, and the second node 404*b*, b, may be the number (e.g., code pair count, etc.) of interaction data objects (e.g., claims, etc.) in which the code pair (e.g., pair of CPT codes, etc.) corresponding to the node pair, (a,b), are present. Each node 404*a-b* in the network graph 402 may represent a distinct interaction code (e.g., CPT) that may be reflective of a behavior of an entity and entity class.

As one example, the network graph 402 may be built by:
Starting with the network N(A,E) with A, E both being empty sets.
For each interaction data object, Clm∈ D; do $$CPTs = \{\text{set of all codes in } Clm\}$$

$$A = A \cup CPTs$$

$$D(a) = D(a) + 1 \text{ for all } a \in CPTs$$

For each pair (a,b), a, b∈ CPTs
If $e_{ab}$ ∈E then E=E and W(eab)=W(eab)+1
And if eab is not ∈E then E=E∪eab and W($e_{ab}$)=1

As illustrated by FIG. 4, the network graph 402 may include a dense graph network in which multiple edges and nodes blend together, which may disrupt the interpretability of the network graph 402. To improve graph interpretability, a relevant network graph may be generated from the network graph 402 by removing one or more outlier nodes. An example of a relevant network graph and/or one or more outlier nodes will now further be described with reference to FIGS. 5A-B.

Figure 5A:
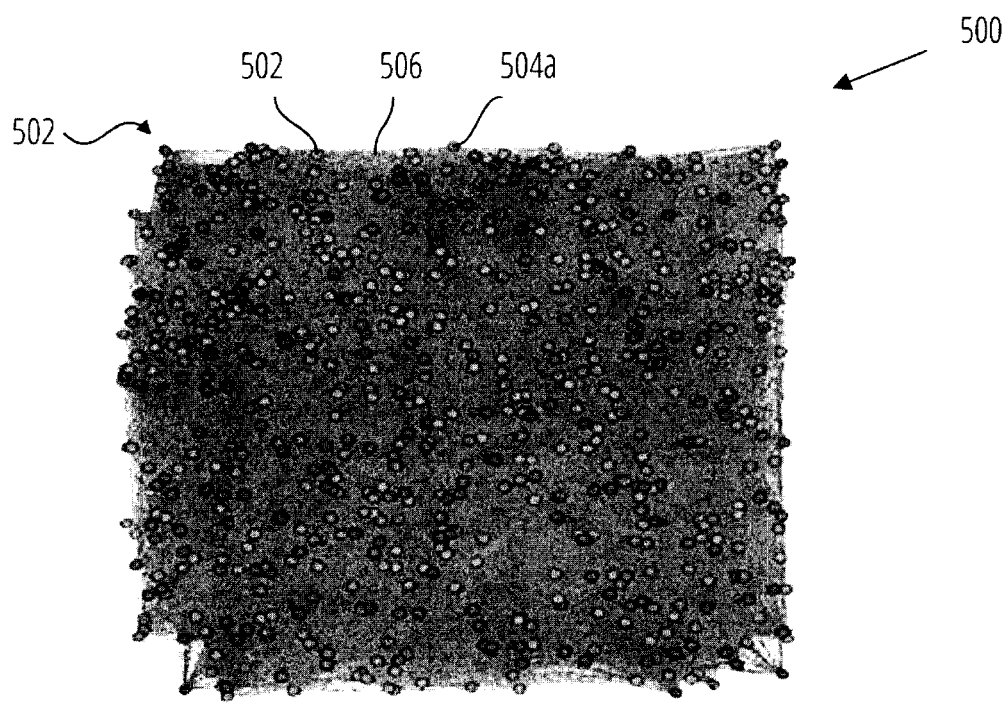
FIG. 5A is an operational example of a relevant network graph in accordance with some embodiments discussed herein.

FIG. 5A is an operational example 500 of a relevant network graph in accordance with some embodiments discussed herein. In some embodiments, the relevant network graph 502 is a refined network graph. For example, the relevant network graph 502 may include a network graph that has been refined to remove one or more outlier nodes. The relevant network graph 502 may include a plurality of nodes 504*a-b* and edges 506. The plurality of nodes 504*a-b* and edges 506 may include a subset of the nodes and edges from an unrefined network graph. By way of example, the nodes 504*a-b* may include a subset of relevant nodes with one or more outlier nodes removed.

In some embodiments, an outlier node is a node of a network graph that satisfies outlier criteria by differing from one or more of the nodes of the network graph. An outlier node, for example, may include a node weight that satisfies one or more node weight thresholds.

In some embodiments, a node weight threshold is a data entity that defines one or more outlier criteria for a network graph. The node weight threshold may include a static and/or dynamic data entity that describes a value and/or value range for one or more node weights. In some examples, a node weight threshold may include first weight threshold and/or a second weight threshold that define a weight range for the plurality of nodes. In some examples, a node weight threshold may include a predefined, static value independent of the plurality of node weights for a network graph. In addition, or alternatively, a node weight threshold may include a dynamic value that is tailored to the node weights for a network graph. By way of example, a node weight threshold may define a weight range that may include a three-sigma range from an average node weight of the network graph.

Figure 5B:
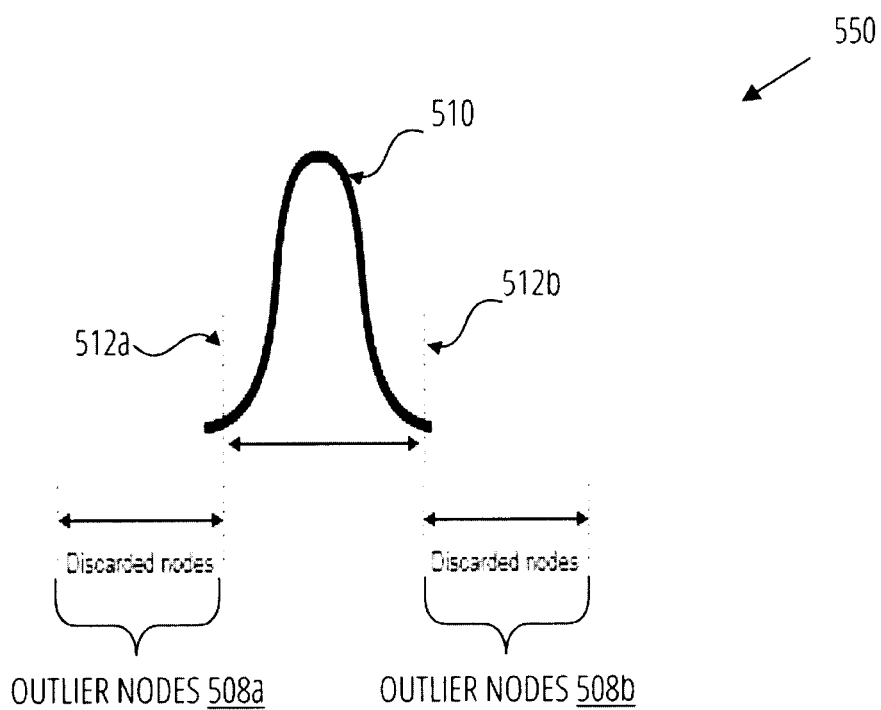
FIG. 5B is an operational example for detecting outliers in accordance with some embodiments discussed herein.

FIG. 5B is an operational example 550 for detecting outliers in accordance with some embodiments discussed herein. The operational example 550 depicts one or more outlier nodes 508*a-b*, a node weight distribution 510, and node weight thresholds 512*a-b*.

In some embodiments, one or more outlier nodes 508*a-b* may be detected based on a node weight distribution 510 of a plurality of nodes from an unrefined network graph. The node weight distribution 510 may include a distribution of the node weights for each node of the unrefined network graph. The outlier nodes 508*a-b* may include one or more low weight nodes 508*a* and/or one or more high weight nodes 508*b* relative to the node weight distribution 510. The low and/or high weight nodes (e.g., outlier nodes 508*a-b*) may be identified based on node weight thresholds 512*a-b*.

In some embodiments, the one or more node weight thresholds 512*a-b* are determined based on an average node weight of the plurality of nodes (e.g., an average node weight from the node weight distribution 510). For example, the one or more node weight thresholds 512*a-b* may include at least a first node weight threshold 512*a* and a second node weight threshold 512*b* that define a weight range for the plurality of nodes. The weight range may include a three-sigma range from an average node weight. For example, each node with a node weight falling outside of the weight range may be classified as an outlier node 508*a-b* and removed from the unrefined network graph to generate the relevant network graph 502.

In some embodiments, the one or more outlier nodes 508*a-b* are identified based on a comparison between the node weights of one or more respective nodes and the one or more node weight thresholds 512*a-b*. For example, since the node weight (e.g., degree, etc.) of a node in a network graph may be equal to the number of interaction data objects in which a corresponding interaction code (CPT, etc.) is present in. Interaction codes that are rarely or very frequently present in the interaction data objects will correspond to low and/or very high weight nodes, respectively. For instance, interaction codes which are present rarely or very frequently in a dataset, D, may correspond to nodes with very low and/or very high node weights in the network graph N(A,E). Low and/or very high node weight nodes may be identified based on a comparison between the node weights of one or more respective nodes and the one or more node weight thresholds 512*a-b*.

For instance, the first node weight threshold 512*a* may be a node weight that is three standard deviations descending from the average node weight of the node weight distribution 510. One or more low weight nodes 508*a* may include one or more nodes with node weights that are below (and/or equal to) the first node weight threshold 512*a*. The second node weight threshold 512*b* may be a node weight that is three standard deviations ascending from the average node weight of the node weight distribution 510. One or more high weight nodes 508*b* may include one or more nodes with node weights that are higher (and/or equal to) the second node weight threshold 512*b*.

The identified outlier nodes 508*a-b* may be removed from the network graph to enable the generation of discreate nodal communities that are of a smaller number with less overlap between them.

For example, returning to FIG. 5A, the relevant network graph 502 may be processed to generate one or more nodal communities.

In some embodiments, a nodal community is a subset of related nodes from the relevant network graph 502. For example, the plurality of nodes 504*a-b* of may be divided into the one or more nodal communities. Each nodal community may include a different subset of the plurality of nodes 504*a-b*. The plurality of related nodes of each respective nodal community may be detected using a community detection model.

In some embodiments, a community detection model is a data entity that describes parameters, hyper-parameters, and/or defined operations of a rules-based algorithm, machine learning model (e.g., model including at least one of one or more rule-based layers, one or more layers that depend on trained parameters, coefficients, and/or the like), and/or the like. In some examples, the community detection model may include a graph community detection algorithm, such as Girvan-Newman, and/or the like. The community detection model may be configured to process the relevant network graph 502 to assign a community classification to each node of the relevant network graph 502. A nodal community may include a subset of node that are each assigned a common community classification label.

In some embodiments, the nodal communities are post-processed to ensure that the nodes of the relevant network graph 502 are divided into at least two communities of a sufficient size. In some examples, smaller communities may be merged with larger communities and/or be removed from the relevant network graph 502. For example, if there are communities, $S_i$, where i=1 . . . m. Then $A = \cup S_i$.

In some embodiments, the size of a community is based on a community cutoff threshold that defines one or more internal and/or external edge weight thresholds for a nodal community. The internal and/or external edges of a nodal community, for example, may be based on an edge type of the edges. An example of the different edge types and for detecting the different edge types will now further be described with reference to FIGS. 6A-B.

Figure 6A:
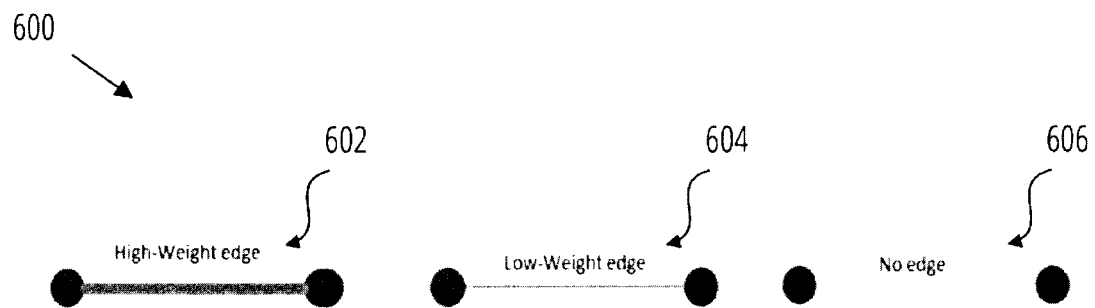
FIG. 6A is an operational example of edge types in accordance with some embodiments discussed herein.

FIG. 6A is an operational example 600 of edge types in accordance with some embodiments discussed herein. The edge types may include a high weight edge 602, a low weight edge 604, and a disconnected edge 606. As described herein, each interaction code (e.g., CPT code, etc.) present in a plurality of interaction data objects may be mapped to a unique and distinct node in a network graph. The high weight edge 602 may exist between a pair of nodes in a network graph in the event that their corresponding interaction codes (e.g., CPT codes) are frequently present in common interaction data objects (e.g., billed together in medical claims, etc.). The disconnected edge 606 may exist between two nodes in which their corresponding interaction codes (e.g., CPT codes, etc.) are never present in a common interaction data object (e.g., never billed in the same medical code). A low weight edge 604 may exist between a pair of nodes in the network graph in the event their corresponding interaction codes (e.g., CPT codes, etc.) are rarely billed together.

In some embodiments, nodal communities include a subset of nodes that are each connected by high weight edges 602. Each nodal community may be disconnected from another nodal community or connected to the other nodal community by a low weight edge 604.

Figure 6B:
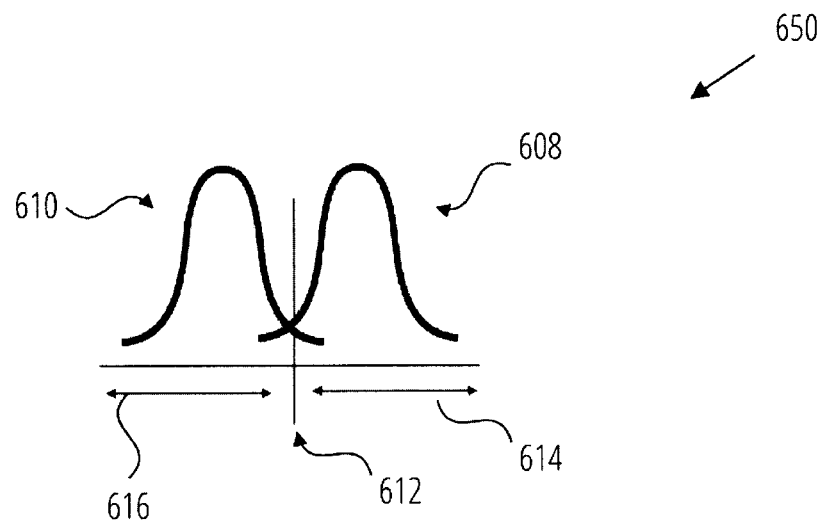
FIG. 6B is an operational example for detecting edge types in accordance with some embodiments discussed herein.

FIG. 6B is an operational example 650 for detecting edge types in accordance with some embodiments discussed herein. In some embodiments, one or more nodal communities may be refined based on one or more community cutoff thresholds 612 corresponding to the one or more nodal communities. The community cutoff threshold 612 for a nodal community may include a threshold edge weight that defines (i) a minimum edge weight for each of a plurality of internal edges 614 respectively connecting two nodes within the nodal community and (ii) a maximum edge weight for each of a plurality of external edges 616 respectively connecting an internal node within the nodal community and an external node outside of the nodal community.

In some embodiments, a community cutoff threshold is a data entity that defines one or more community criteria for a network graph. A community cutoff threshold may define one or more threshold edge weights between the nodes of a nodal community. By way of example, a community cutoff threshold for a nodal community may include a threshold edge weight that defines (i) a minimum edge weight for each of a plurality of internal edges 614 respectively connecting two nodes within the nodal community and/or (ii) a maximum edge weight for each of a plurality of external edges 616 respectively connecting an internal node within the nodal community and an external node outside of the nodal community.

The community cutoff threshold may include a static and/or dynamic data entity that describes a value and/or value range for one or more edge weights. In some examples, a community cutoff threshold may include a predefined, static value independent of the plurality of edge weights for a nodal community. In addition, or alternatively, the community cutoff threshold may be based on an intersection between (i) a second distribution 610 of edge weights for each of the plurality of internal edges 614 and/or (ii) a first distribution 608 of edge weights for each of the plurality of external edges 616.

For example, there may be two types of edges present in a nodal community. A first edge type may include an internal edge 614 between two nodes from the nodal community. The second distribution 610 may include edge weights from each of the internal edges 614 of a network graph. A second edge type may include an external edge 616 between one node within the nodal community and a second node that belongs to another nodal community. The first distribution 608 may include edge weights from each of the external edges 616 of a network graph.

The community cutoff threshold 612 for the nodal community may include a weight corresponding to the intersection point of the probability distribution functions (PDFs) of the second distribution 610 and the first distribution 608. An edge with an edge weight less than the community cutoff threshold 612 may be considered a low weight edge 604 and an edge with an edge weight greater than the community cutoff threshold 612 may be considered high weight edge 602.

In this way, nodes within a nodal community may be connected by high weight edge 602 which may imply that their corresponding interaction codes are often related (e.g., are often billed together in medical claims, etc.). In addition, or alternatively, nodes between two nodal communities may either be disconnected or connected by low weight edges 604 which may imply that their corresponding interaction codes are often unrelated (e.g., are rarely billed together in medical claims, etc.).

Once generated, the nodal communities of a network graph may be aligned to generate one or more node clusters. An example of one or more node clusters will now further be described with reference to FIG. 7.

Figure 7:
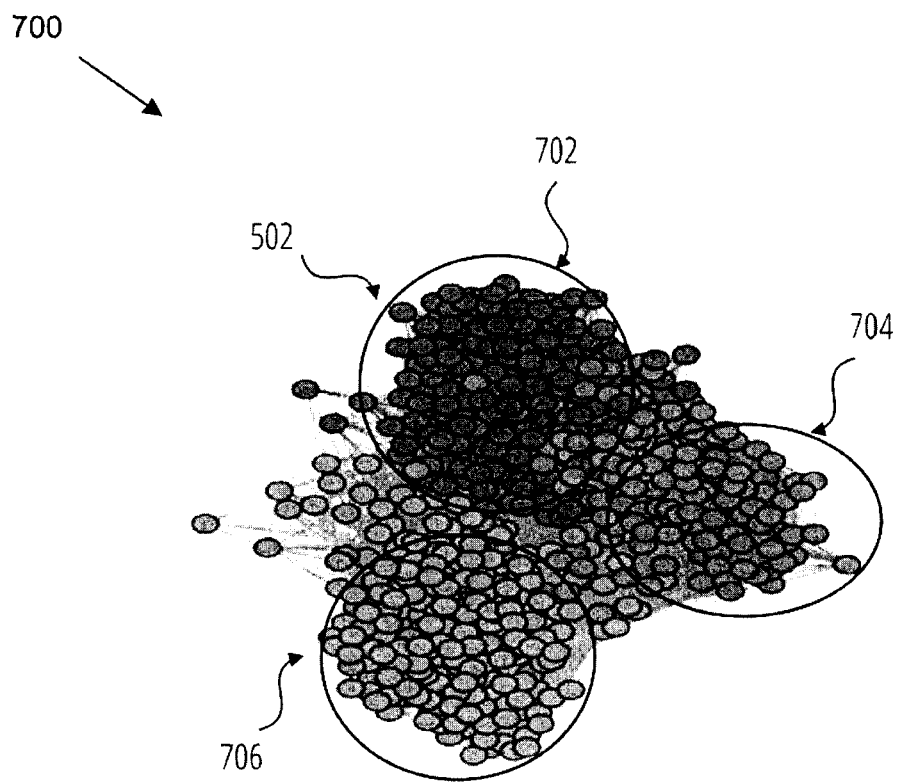
FIG. 7 is an operational example of node clusters in accordance with some embodiments discussed herein.

FIG. 7 is an operational example 700 of node clusters in accordance with some embodiments discussed herein. The operational example 700 includes the relevant network graph 502 with one or more node clusters 702, 704, 706. The one or more node clusters, for example, may include a first node cluster 702, a second node cluster 704, and/or a third node cluster 706. The node clusters 702, 704, 706 may be generated by applying an alignment model, such as GRAph ALigner (GRAAL), and/or the like, to the nodal communities of the relevant network graph 502. The node clusters 702, 704, 706 may include three distinct clusters or segments interactive codes (e.g., CPT codes, etc.) that may reflect the usage behavior of different subgroups within an entity class. In some examples, an entity subclass label may be identified for each node cluster to generate a class taxonomy of m classifications in the network graph N.

Figure 8:
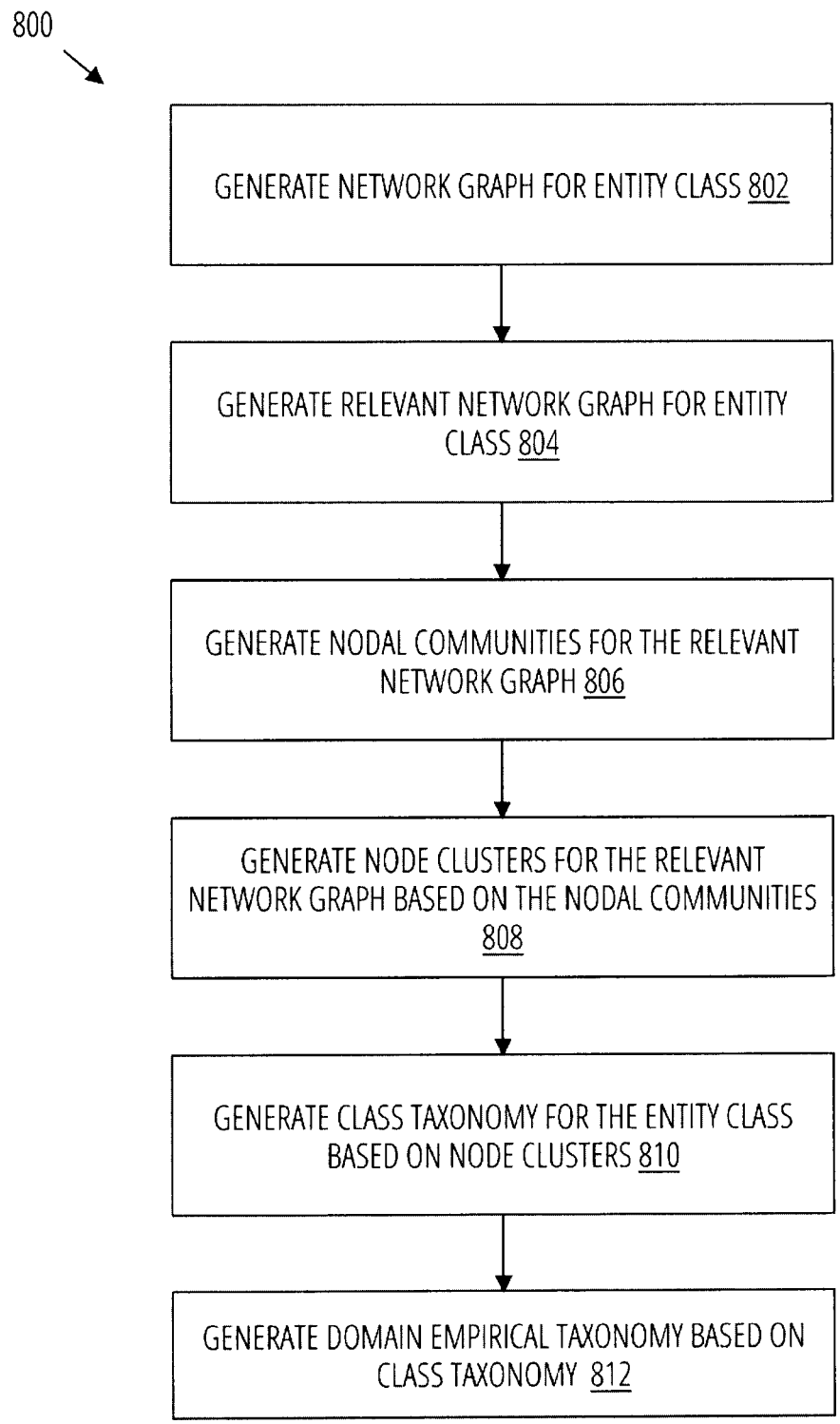
FIG. 8 is a flowchart showing an example of a process for generating a network graph in accordance with some embodiments discussed herein.

FIG. 8 is a flowchart showing an example of a process 800 for generating a network graph in accordance with some embodiments discussed herein. The flowchart depicts graph-based techniques for generating granular, behavior-based, classifications for entities within a predictive domain that overcome various limitations such as a lack of detail and/or predictive accuracy of traditional domain taxonomies. The graph-based techniques may be implemented by one or more computing devices, entities, and/or systems described herein. For example, via the various steps/operations of the process 800, the computing system 100 may leverage the graph-based techniques to overcome the various limitations with conventional domain taxonomies that include general categories lacking predictive power and that are susceptible to misclassifications.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some embodiments, the process 800 includes, at step/operation 802, generating a network graph for an entity class. For example, the computing system 100 may generate the network graph for the entity class. For instance, the computing system 100 may generate the network graph for the entity class based on a plurality of interaction data objects corresponding to a plurality of entities of the entity class. Each of the interaction data objects may include one or more interaction codes. The network graph may include a plurality of nodes and a plurality of edges. A particular node of the plurality of nodes may correspond to a particular interaction code of at least one of the plurality of interaction data objects. A particular edge of the plurality of edges may connect a node pair of the plurality of nodes that are associated with a particular interaction data object.

A particular node may be associated with a node weight indicative of a code frequency of the particular interaction code in the plurality of interaction data objects. The node weight may be based on a code count identifying a number of the plurality of interaction data objects that include the particular interaction code.

A particular edge may be associated with an edge weight indicative of a code pair frequency of the node pair in the plurality of interaction data objects. The node pair may correspond to a first interaction code and a second interaction code that are associated with a particular interaction data object. The edge weight may be based on a code pair count identifying a number of the plurality of interaction data objects that include the first interaction code and the second code interaction code.

In some embodiments, the process 800 includes, at step/operation 804, generating a relevant network graph for the entity class. For example, the computing system 100 may generate the relevant network graph for the entity class by refining the network graph. For instance, the computing system 100 may generate the relevant network graph by removing one or more outlier nodes from the network graph.

In some examples, the computing system 100 may identify the one or more outlier nodes from the plurality of nodes of a network graph based on the node weights for each of the nodes. The computing system 100 may determine one or more node weight thresholds based on an average node weight of the plurality of nodes. The one or more node weight thresholds, for example, may include at least a first weight threshold and a second weight threshold that define a weight range for the plurality of nodes. The weight range may include a three-sigma range from the average node weight. The computing system 100 may identify the one or more outlier nodes based on a comparison between the node weights and the one or more node weight thresholds.

In some embodiments, the process 800 includes, at step/operation 806, generating nodal communities for the relevant network graph. For example, the computing system 100 may generate the nodal communities for the relevant network graph. For instance, the nodal communities may generate, using a community detection model, one or more nodal communities for the plurality of nodes. In some examples, the computing system may refine the one or more nodal communities based on one or more community cutoff thresholds corresponding to the one or more nodal communities. For instance, a community cutoff threshold for a nodal community may include a threshold edge weight that defines (i) a minimum edge weight for each of a plurality of internal edges respectively connecting two nodes within the nodal community and (ii) a maximum edge weight for each of a plurality of external edges respectively connecting an internal node within the nodal community and an external node outside of the nodal community. In some examples, the community cutoff threshold may be based on an intersection between (i) a first distribution of edge weights for each of the plurality of internal edges and (ii) a second distribution of edge weights for each of the plurality of external edges.

In some embodiments, the process 800 includes, at step/operation 808, generating node clusters for the relevant network graph based on the nodal communities. For example, the computing system 100 may generate the node clusters for the relevant network graph based on the nodal communities. For instance, the computing system 100 may generate the one or more node clusters based on the node weights and the edge weights of the network graph. In some examples, the computing system may generate the one or more node clusters from the relevant network graph. In some examples, the computing system 100 may generate the one or more node clusters by aligning the plurality of nodes based on the one or more nodal communities.

In some embodiments, the process 800 includes, at step/operation 810, generating a class taxonomy for the entity class based on the node clusters. For example, the computing system 100 may generate the class taxonomy for the entity class based on the node clusters. For instance, the computing system may generate the class taxonomy for the entity class based on the one or more node clusters. In some examples, the class taxonomy may be indicative of a plurality of homogenous subclasses of the entity class. The class taxonomy may include a respective entity subclass label for each of the one or more node clusters of the relevant network graph.

In some embodiments, the process 800 includes, at step/operation 812, generating a domain empirical taxonomy based on the class taxonomy. For example, the computing system 100 may generate the domain empirical taxonomy based on the class taxonomy. For instance, the computing system 100 may generate the domain empirical taxonomy for a predictive domain based on the network graph and the class taxonomy. The predictive domain may include a plurality of entity classes. In some examples, the domain empirical taxonomy may include a respective class taxonomy for each of the plurality of entity classes. In some examples, a respective class taxonomy may correspond to a respective network graph.

In some embodiments, the computing system 100 may store and/or provide the domain empirical taxonomy for use in generating a predictive classification for an entity associated with the predictive domain.

Figure 9:
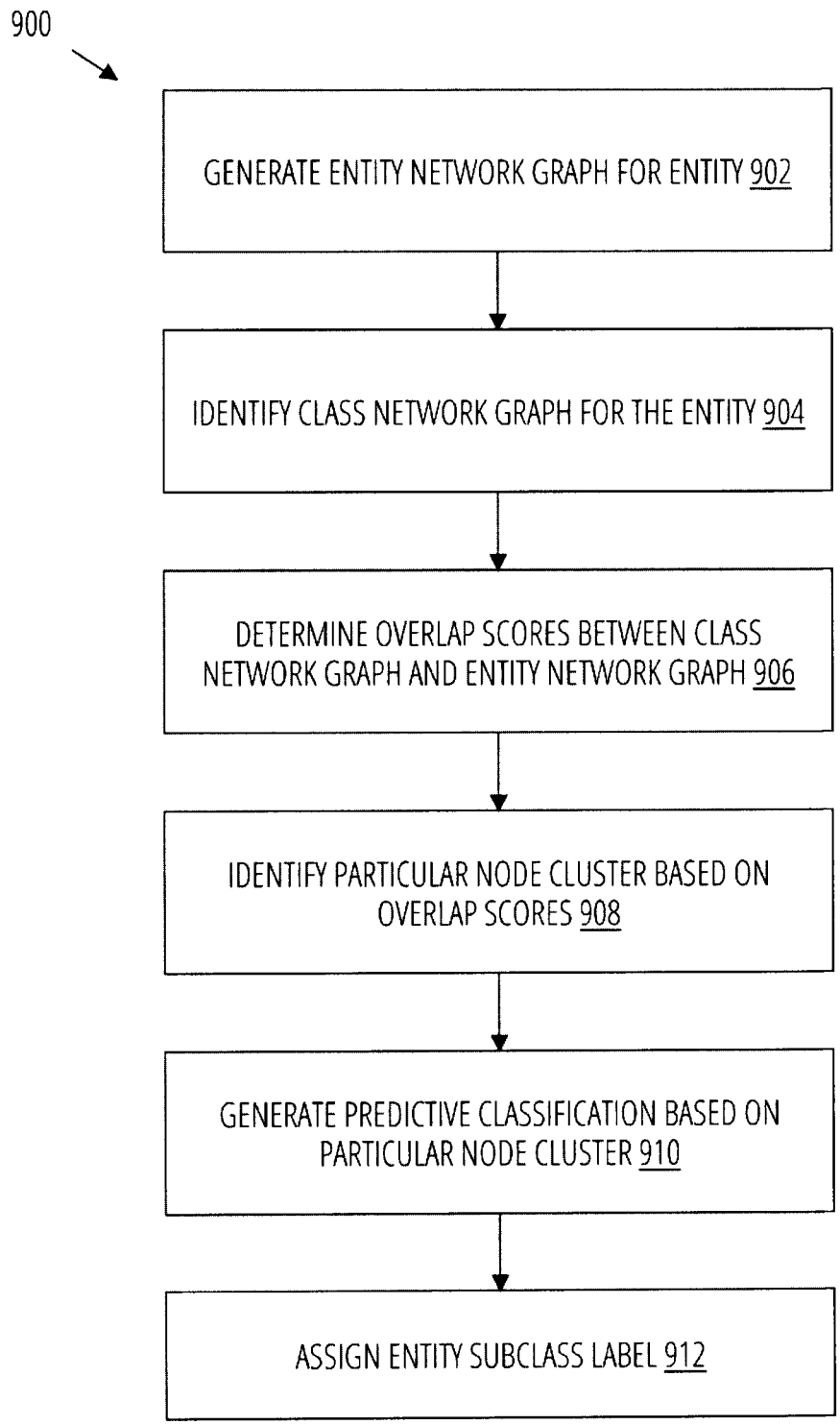
FIG. 9 is a flowchart showing an example of a process for generating a graph-based predictive classification in accordance with some embodiments discussed herein.

FIG. 9 is a flowchart showing an example of a process 900 for generating a graph-based predictive classification in accordance with some embodiments discussed herein. The flowchart depicts graph-based techniques for generating a predictive classification for an entity based on the entity's behavior within the predictive domain. These behavior-based predictions may be leveraged as additional inputs for machine learning models to improve the performance of traditional machine learning models for a predictive domain. The graph-based techniques may be implemented by one or more computing devices, entities, and/or systems described herein. For example, via the various steps/operations of the process 900, the computing system 100 may leverage the graph-based techniques to overcome the various limitations with conventional machine learning model by improving model performance through the incorporation of granular, behavior-based predictions.

FIG. 9 illustrates an example process 900 for explanatory purposes. Although the example process 900 depicts a particular sequence of steps/operations, the sequence may be altered without departing from the scope of the present disclosure. For example, some of the steps/operations depicted may be performed in parallel or in a different sequence that does not materially impact the function of the process 900. In other examples, different components of an example device or system that implements the process 900 may perform functions at substantially the same time or in a specific sequence.

In some embodiments, the process 900 includes, at step/operation 902, generating an entity network graph. For example, the computing system 100 may generate the entity network graph. For instance, the computing system 100 may generate the entity network graph for an entity within a predictive domain based on a plurality of interaction data objects for the entity.

In some embodiments, the process 900 includes, at step/operation 904, identifying a class network graph for the entity. For example, the computing system 100 may identify the class network graph for the entity. For instance, the computing system 100 may identify a class network graph based on an entity class corresponding to the entity. The class network graph may include a plurality of class nodes arranged into one or more node clusters. Each particular node cluster may include a subset of the plurality of class nodes.

In some examples, the computing system 100 may receive a domain empirical taxonomy for a domain taxonomy associated with the entity. The domain empirical taxonomy may be previously generated by the computing system. In addition, or alternatively, the domain empirical taxonomy may be previously generated by a third-party computing system. The domain taxonomy may include a plurality of entity classes and the domain empirical taxonomy may include a respective class taxonomy for each of the plurality of entity classes. The computing system 100 may identify the class network graph corresponding to the entity class from the domain empirical taxonomy.

Using the domain empirical taxonomy, an entity may be classified into an appropriate entity sub-class such that the entity is assigned a community of entities that represent their actual behavior (e.g., usage of CPT's from submitted claims in a clinical domain, etc.) within any stated entity class of a general domain taxonomy.

In some embodiments, the process 900 includes, at step/operation 906, determining overlap scores between the class network graph and/or the entity network graph. For example, the computing system 100 may determine one or more overlap scores between the class network graph and/or the entity network graph. The one or more overlap scores may include a respective overlap score for each of the one or more node clusters of the class network graph. In some examples, the computing system 100 may identify one or more entity nodes from the entity network graph that correspond to a subset of the plurality of class nodes for a respective node cluster. The computing system 100 may determine the overlap score for the respective node cluster based on an aggregation of a respective node weight for each of the one or more entity nodes.

In some embodiments, the process 900 includes, at step/operation 908, identifying a particular node cluster based on the overlap scores. For example, the computing system 100 may identify the particular node cluster based on the overlap scores. The computing system 100 may identify the particular node cluster from the one or more node clusters based on the one or more overlap scores. In some examples, a particular overlap score for the particular node cluster may be the highest overlap score relative to the one or more overlap scores.

In some embodiments, the process 900 includes, at step/operation 910, generating a predictive classification based on the particular node cluster. For example, the computing system 100 may generate the predictive classification based on the particular node cluster. For instance, the computing system 100 may generate the predictive classification for the entity based on a comparison between the class network graph and the entity network graph. For instance, the class network graph and the entity network graph may be compared to identify the particular node cluster. The particular node cluster may correspond to the predictive classification. For instance, the particular node cluster may be associated with an entity subclass label and the predictive classification may include a predicted entity subclass label for the entity.

In some embodiments, the process 900 includes, at step/operation 912, assigning an entity subclass label. For example, the computing system 100 may assign the entity subclass label to the entity. By way of example, the predictive classification may include a predicted entity subclass label for the entity. The computing system 100 may assign the predicted entity subclass label to the entity.

In some examples, supervised and/or unsupervised machine learning models and/or any data analysis/processing for entity segmentation and/or peer group identification for entities within a prediction domain may leverage entity subclass labels to improve the machine learning performance and/or the granularity of outputs for the entities within the prediction domain. By way of example, a respective entity subclass label may be assigned to each entity in a predictive domain by:

For all entities P in a dataset D, do;
create entity network graph $N(A',E')$ using entity's interaction object data $D(S_i)$=sum of degrees of all nodes in $A' \cap S_i$ $\forall$ node cluster $S_i$ i=1 . . . m
$S_{max}$=max $\{D(S_i)$ i=1 . . . m$\}$ Assign entity subclass label corresponding to $S_{max}$ to entity P.

For example, the computing system 100 may select a machine learning model for the entity based on the predictive classification and one or more evaluation metrics for the machine learning model. For example, the one or more evaluation metrics may include an evaluation metric corresponding to each of one or more node clusters of the class network graph. In some examples, the one or more evaluation metrics may include a true positive rate for the machine learning model relative to a plurality of historical entities associated with the predictive classification.

VI. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method comprising: generating, by one or more processors, a network graph for an entity class based on a plurality of interaction data objects corresponding to a plurality of entities of the entity class, wherein: (i) each of the plurality of interaction data objects comprises one or more interaction codes, (ii) the network graph comprises a plurality of nodes and a plurality of edges, (iii) a particular node of the plurality of nodes corresponds to a particular interaction code of at least one of the plurality of interaction data objects, (iv) a particular edge of the plurality of edges connects a node pair of the plurality of nodes that is associated with a particular interaction data object, (v) the particular node is associated with a node weight indicative of a code frequency of the particular interaction code in the plurality of interaction data objects, and (vi) the particular edge is associated with an edge weight indicative of a code pair frequency for two interaction codes corresponding to the node pair in the plurality of interaction data objects; generating, by the one or more processors, one or more node clusters based on the node weight and the edge weight; and generating, by the one or more processors, a class taxonomy for the entity class based on the one or more node clusters, wherein the class taxonomy is indicative of a plurality of homogenous subclasses of the entity class.

Example 2. The computer-implemented method of example 1 further comprising: generating a domain empirical taxonomy for a predictive domain based on the network graph and the class taxonomy, wherein: (i) the predictive domain comprises a plurality of entity classes, (ii) the domain empirical taxonomy comprises a respective class taxonomy for each of the plurality of entity classes, and (iii)

the respective class taxonomy corresponds to a respective network graph; and providing the domain empirical taxonomy for use in generating a predictive classification for an entity associated with the predictive domain.

Example 3. The computer-implemented method of any of examples 1 or 2, wherein the node weight is based on a code count identifying a number of the plurality of interaction data objects that comprise the particular interaction code.

Example 4. The computer-implemented method of any of the preceding examples, wherein the node pair corresponds to a first interaction code and a second interaction code that are associated with the particular interaction data object, and wherein the edge weight is based on a code pair count identifying a number of the plurality of interaction data objects that comprise the first interaction code and the second interaction code.

Example 5. The computer-implemented method of any of the preceding examples, wherein generating the one or more node clusters comprises: identifying one or more outlier nodes from the plurality of nodes based on the node weight; generating a relevant network graph by removing the one or more outlier nodes from the network graph; and generating the one or more node clusters from the relevant network graph.

Example 6. The computer-implemented method of example 5, wherein identifying the one or more outlier nodes comprises: determining one or more node weight thresholds based on an average node weight of the plurality of nodes; and identifying the one or more outlier nodes based on a comparison between the node weight and the one or more node weight thresholds.

Example 7. The computer-implemented method of example 6, wherein the one or more node weight thresholds comprise at least a first weight threshold and a second weight threshold that define a weight range for the plurality of nodes, and wherein the weight range comprises a three-sigma range from the average node weight.

Example 8. The computer-implemented method of any of the preceding examples, wherein generating the one or more node clusters comprises: generating, using a community detection model, one or more nodal communities for the plurality of nodes; and generating the one or more node clusters by aligning the plurality of nodes based on the one or more nodal communities.

Example 9. The computer-implemented method of example 8, wherein generating the one or more node clusters comprises: refining the one or more nodal communities based on one or more community cutoff thresholds corresponding to the one or more nodal communities, wherein a community cutoff threshold for a nodal community comprises a threshold edge weight that defines (i) a minimum edge weight for each of a plurality internal edges respectively connecting two nodes within the nodal community and (ii) a maximum edge weight for each of a plurality of external edges respectively connecting an internal node within the nodal community and an external node outside of the nodal community.

Example 10. The computer-implemented method of example 9, wherein the community cutoff threshold is based on an intersection between (i) a first distribution of edge weights for each of the plurality of internal edges and (ii) a second distribution of edge weights for each of the plurality of external edges.

Example 11. The computer-implemented method of any of the preceding examples, wherein the class taxonomy comprises a respective entity subclass label for each of the one or more node clusters.

Example 12. A computing apparatus comprising memory and one or more processors communicatively coupled to the memory, the one or more processors configured to: generate a network graph for an entity class based on a plurality of interaction data objects corresponding to a plurality of entities of the entity class, wherein: (i) each of the plurality of interaction data objects comprises one or more interaction codes, (ii) the network graph comprises a plurality of nodes and a plurality of edges, (iii) a particular node of the plurality of nodes corresponds to a particular interaction code of at least one of the plurality of interaction data objects, (iv) a particular edge of the plurality of edges connects a node pair of the plurality of nodes that is associated with a particular interaction data object, (v) the particular node is associated with a node weight indicative of a code frequency of the particular interaction code in the plurality of interaction data objects, and (vi) the particular edge is associated with an edge weight indicative of a code pair frequency for two interaction codes corresponding to the node pair in the plurality of interaction data objects; generate one or more node clusters based on the node weight and the edge weight; and generate a class taxonomy for the entity class based on the one or more node clusters, wherein the class taxonomy is indicative of a plurality of homogenous subclasses of the entity class.

Example 13. The computing apparatus of example 12, wherein the one or more processors are further configured to: generate a domain empirical taxonomy for a predictive domain based on the network graph and the class taxonomy, wherein: (i) the predictive domain comprises a plurality of entity classes, (ii) the domain empirical taxonomy comprises a respective class taxonomy for each of the plurality of entity classes, and (iii) the respective class taxonomy corresponds to a respective network graph; and provide the domain empirical taxonomy for use in generating a predictive classification for an entity associated with the predictive domain.

Example 14. The computing apparatus of any of examples 12 or 13, wherein the node weight is based on a code count identifying a number of the plurality of interaction data objects that comprise the particular interaction code.

Example 15. The computing apparatus of any of examples 12 through 14, wherein the node pair corresponds to a first interaction code and a second interaction code that are associated with the particular interaction data object, and wherein the edge weight is based on a code pair count identifying a number of the plurality of interaction data objects that comprise the first interaction code and the second interaction code.

Example 16. The computing apparatus of any of examples 12 through 15, wherein generating the one or more node clusters comprises: identifying one or more outlier nodes from the plurality of nodes based on the node weight; generating a relevant network graph by removing the one or more outlier nodes from the network graph; and generating the one or more node clusters from the relevant network graph.

Example 17. The computing apparatus of example 16, wherein identifying the one or more outlier nodes comprises: determining one or more node weight thresholds based on an average node weight of the plurality of nodes; and identifying the one or more outlier nodes based on a comparison between the node weight and the one or more node weight thresholds.

Example 18. The computing apparatus of example 17, wherein the one or more node weight thresholds comprise at least a first weight threshold and a second weight threshold that define a weight range for the plurality of nodes, and wherein the weight range comprises a three-sigma range from the average node weight.

Example 19. One or more non-transitory computer-readable storage media including instructions that, when executed by one or more processors, cause the one or more processors to: generate a network graph for an entity class based on a plurality of interaction data objects corresponding to a plurality of entities of the entity class, wherein: (i) each of the plurality of interaction data objects comprises one or more interaction codes, (ii) the network graph comprises a plurality of nodes and a plurality of edges, (iii) a particular node of the plurality of nodes corresponds to a particular interaction code of at least one of the plurality of interaction data objects, (iv) a particular edge of the plurality of edges connects a node pair of the plurality of nodes that is associated with a particular interaction data object, (v) the particular node is associated with a node weight indicative of a code frequency of the particular interaction code in the plurality of interaction data objects, and (vi) the particular edge is associated with an edge weight indicative of a code pair frequency for two interaction codes corresponding to the node pair in the plurality of interaction data objects; generate one or more node clusters based on the node weight and the edge weight; and generate a class taxonomy for the entity class based on the one or more node clusters, wherein the class taxonomy is indicative of a plurality of homogenous subclasses of the entity class.

Example 20. The one or more non-transitory computer-readable storage media of example 19, wherein the class taxonomy comprises a respective entity subclass label for each of the one or more node clusters.

Example 21. A computer-implemented method comprising: generating, by one or more processors, an entity network graph for an entity based on a plurality of interaction data objects for the entity, wherein: (i) each of the plurality of interaction data objects comprises one or more interaction codes, (ii) the entity network graph comprises a plurality of nodes and a plurality of edges, (iii) a particular node of the plurality of nodes corresponds to a particular interaction code of at least one of the plurality of interaction data objects, (iv) a particular edge of the plurality of edges connects a node pair of the plurality of nodes that is associated with a particular interaction data object, (v) the particular node is associated with a node weight indicative of a code frequency in the plurality of interaction data objects, and (vi) the particular edge is associated with an edge weight indicative of a code pair frequency in the plurality of interaction data objects; identifying, by the one or more processors, a class network graph based on an entity class corresponding to the entity; and generating, by the one or more processors, a predictive classification for the entity based on a comparison between the class network graph and the entity network graph.

Example 22. The computer-implemented method of example 21, wherein the predictive classification comprises an entity subclass label and the computer-implemented method further comprises: assigning the entity subclass label to the entity.

Example 23. The computer-implemented method of any of examples 21 or 22, wherein the class network graph comprises a plurality of class nodes arranged into one or more node clusters, and wherein a particular node cluster comprises a subset of the plurality of class nodes.

Example 24. The computer-implemented method of example 23, wherein generating the predictive classification comprises: determining one or more overlap scores between the class network graph and the entity network graph, wherein the one or more overlap scores comprise a respective overlap score for each of the one or more node clusters; identifying the particular node cluster from the one or more node clusters based on the one or more overlap scores, wherein a particular overlap score for the particular node cluster is a highest overlap score relative to the one or more overlap scores; and generating the predictive classification based on the particular node cluster.

Example 25. The computer-implemented method of example 24, wherein determining the particular overlap score comprises: identifying one or more entity nodes from the entity network graph that correspond to the subset of the plurality of class nodes; and determining the particular overlap score based on an aggregation of a respective node weight for each of the one or more entity nodes.

Example 26. The computer-implemented method of any of examples 24 or 25, wherein the particular node cluster corresponds to the predictive classification.

Example 27. The computer-implemented method of any of examples 21 through 26, wherein identifying the class network graph comprises: receiving a domain empirical taxonomy for a domain taxonomy associated with the entity, wherein: (i) the domain taxonomy comprises a plurality of entity classes, and (ii) the domain empirical taxonomy comprises a respective class taxonomy for each of the plurality of entity classes; and identifying the class network graph corresponding to the entity class from the domain empirical taxonomy.

Example 28. The computer-implemented method of example 27, wherein the domain empirical taxonomy is previously generated by a third party.

Example 29. The computer-implemented method of any of examples 21 through 28 further comprising selecting a machine learning model for the entity based on the predictive classification and one or more evaluation metrics for the machine learning model.

Example 30. The computer-implemented method of example 29, wherein the one or more evaluation metrics comprise an evaluation metric corresponding to each of one or more node clusters of the class network graph.

Example 31. The computer-implemented method of any of examples 29 and 30, wherein the one or more evaluation metrics comprise a true positive rate for the machine learning model relative to a plurality of historical entities associated with the predictive classification.

Example 32. The computer-implemented method of any of examples 21 through 31, wherein the node weight is based on a code count identifying a number of the plurality of interaction data objects that comprise the particular interaction code.

Example 33. The computer-implemented method of any of examples 21 through 32, wherein the node pair corresponds to a first interaction code and a second interaction code that are associated with the particular interaction data object, and wherein the edge weight is based on a code pair count identifying a number of the plurality of interaction data objects that comprise the first interaction code and the second code interaction code.

Example 34. A computing apparatus comprising memory and one or more processors communicatively coupled to the memory, the one or more processors configured to: generate an entity network graph for an entity based on a plurality of interaction data objects for the entity, wherein: (i) each of the plurality of interaction data objects comprises one or more interaction codes, (ii) the entity network graph comprises a plurality of nodes and a plurality of edges, (iii) a particular node of the plurality of nodes corresponds to a particular interaction code of at least one of the plurality of interaction data objects, (iv) a particular edge of the plurality of edges connects a node pair of the plurality of nodes that is associated with a particular interaction data object, (v) the particular node is associated with a node weight indicative of a code frequency in the plurality of interaction data objects, and (vi) the particular edge is associated with an edge weight indicative of a code pair frequency in the plurality of interaction data objects; identify a class network graph based on an entity class corresponding to the entity; and generate a predictive classification for the entity based on a comparison between the class network graph and the entity network graph.

Example 35. The computing apparatus of example 34, wherein the predictive classification comprises an entity subclass label and wherein the one or more processors are further configured to: assign the entity subclass label to the entity.

Example 36. The computing apparatus of any of examples 34 or 35, wherein the class network graph comprises a plurality of class nodes arranged into one or more node clusters, and wherein a particular node cluster comprises a subset of the plurality of class nodes.

Example 37. The computing apparatus of example 36, wherein generating the predictive classification comprises: determining one or more overlap scores between the class network graph and the entity network graph, wherein the one or more overlap scores comprise a respective overlap score for each of the one or more node clusters; identifying the particular node cluster from the one or more node clusters based on the one or more overlap scores, wherein a particular overlap score for the particular node cluster is a highest overlap score relative to the one or more overlap scores; and generating the predictive classification based on the particular node cluster.

Example 38. The computing apparatus of example 37, wherein determining the particular overlap score comprises: identifying one or more entity nodes from the entity network graph that correspond to the subset of the plurality of class nodes; and determining the particular overlap score based on an aggregation of a respective node weight for each of the one or more entity nodes.

Example 39. One or more non-transitory computer-readable storage media including instructions that, when executed by one or more processors, cause the one or more processors to: generate an entity network graph for an entity based on a plurality of interaction data objects for the entity, wherein: (i) each of the plurality of interaction data objects comprises one or more interaction codes, (ii) the entity network graph comprises a plurality of nodes and a plurality of edges, (iii) a particular node of the plurality of nodes corresponds to a particular interaction code of at least one of the plurality of interaction data objects, (iv) a particular edge of the plurality of edges connects a node pair of the plurality of nodes that is associated with a particular interaction data object, (v) the particular node is associated with a node weight indicative of a code frequency in the plurality of interaction data objects, and (vi) the particular edge is associated with an edge weight indicative of a code pair frequency in the plurality of interaction data objects; identify a class network graph based on an entity class corresponding to the entity; and generate a predictive classification for the entity based on a comparison between the class network graph and the entity network graph.

Example 40. The one or more non-transitory computer-readable storage media of example 39, wherein identifying the class network graph comprises: receiving a domain empirical taxonomy for a domain taxonomy associated with the entity, wherein: (i) the domain taxonomy comprises a plurality of entity classes, and (ii) the domain empirical taxonomy comprises a respective class taxonomy for each of the plurality of entity classes; and identifying the class network graph corresponding to the entity class from the domain empirical taxonomy.

The invention claimed is:

1. A computer-implemented method comprising:
   generating, by one or more processors, a network graph for an entity class based on a plurality of interaction data objects corresponding to a plurality of entities of the entity class, wherein:
   (i) the plurality of interaction data objects comprises one or more interaction codes,
   (ii) the network graph comprises a plurality of nodes and a plurality of edges,
   (iii) a first node of the plurality of nodes corresponds to a first interaction code of at least one of the plurality of interaction data objects,
   (iv) a first edge of the plurality of edges connects a node pair comprising the first node and a second node of the plurality of nodes that is associated with a first interaction data object of the plurality of interaction data objects,
   (v) the first node is associated with a node weight indicative of a code frequency of the first interaction code in the plurality of interaction data objects, and
   (vi) the first edge is associated with an edge weight indicative of a code pair frequency for two interaction codes corresponding to the node pair in the plurality of interaction data objects;
   generating, by the one or more processors, a relevant network graph by removing one or more outlier nodes of the plurality of nodes;
   generating, by the one or more processors, one or more node clusters based on the relevant network graph, the node weight, and the edge weight;
   generating, by the one or more processors, a class taxonomy for the entity class based on the one or more node clusters, wherein the class taxonomy is indicative of a plurality of homogenous subclasses of the entity class; and
   training, by the one or more processors, one or more machine learning models based at least in part on the relevant network graph and the class taxonomy.

2. The computer-implemented method of claim 1 further comprising:
   generating a domain empirical taxonomy for a predictive domain based on the network graph and the class taxonomy, wherein:
   (i) the predictive domain comprises a plurality of entity classes,
   (ii) the domain empirical taxonomy comprises a respective class taxonomy for each of the plurality of entity classes, and
   (iii) the respective class taxonomy corresponds to a respective network graph; and
   providing the domain empirical taxonomy for use in generating a predictive classification for an entity associated with the predictive domain.

3. The computer-implemented method of claim 1, wherein the node weight is based on a code count identifying a number of the plurality of interaction data objects that comprise the first interaction code.

4. The computer-implemented method of claim 1, wherein the node pair corresponds to the first interaction code and a second interaction code that are associated with the first interaction data object, and wherein the edge weight is based on a code pair count identifying a number of the plurality of interaction data objects that comprise the first interaction code and the second interaction code.

5. The computer-implemented method of claim 1, wherein generating the one or more node clusters comprises:
identifying the one or more outlier nodes from the plurality of nodes based on the node weight.

6. The computer-implemented method of claim 5, wherein identifying the one or more outlier nodes comprises:
determining one or more node weight thresholds based on an average node weight of the plurality of nodes; and
identifying the one or more outlier nodes based on a comparison between the node weight and the one or more node weight thresholds.

7. The computer-implemented method of claim 6, wherein the one or more node weight thresholds comprise at least a first weight threshold and a second weight threshold that define a weight range for the plurality of nodes, and wherein the weight range comprises a three-sigma range from the average node weight.

8. The computer-implemented method of claim 1, wherein generating the one or more node clusters comprises:
generating, using a community detection model, one or more nodal communities for the plurality of nodes; and
generating the one or more node clusters by aligning the plurality of nodes based on the one or more nodal communities.

9. The computer-implemented method of claim 8, wherein generating the one or more node clusters comprises:
refining the one or more nodal communities based on one or more community cutoff thresholds corresponding to the one or more nodal communities, wherein a community cutoff threshold of the one or more community cutoff thresholds for a nodal community of the one or more nodal communities comprises a threshold edge weight that defines (i) a minimum edge weight for a plurality of internal edges respectively connecting two nodes within the nodal community and (ii) a maximum edge weight for a plurality of external edges respectively connecting an internal node within the nodal community and an external node outside of the nodal community.

10. The computer-implemented method of claim 9, wherein the community cutoff threshold is based on an intersection between (i) a first distribution of edge weights for the plurality of internal edges and (ii) a second distribution of edge weights for the plurality of external edges.

11. The computer-implemented method of claim 1, wherein the class taxonomy comprises a respective entity subclass label for the one or more node clusters.

12. A computing system comprising memory and one or more processors communicatively coupled to the memory, the one or more processors configured to perform operations comprising:
generating a network graph for an entity class based on a plurality of interaction data objects corresponding to a plurality of entities of the entity class, wherein:
(i) the plurality of interaction data objects comprises one or more interaction codes,
(ii) the network graph comprises a plurality of nodes and a plurality of edges,
(iii) a first node of the plurality of nodes corresponds to a first interaction code of at least one of the plurality of interaction data objects,
(iv) a first edge of the plurality of edges connects a node pair of the plurality of nodes that is associated with a first interaction data object of the plurality of interaction data objects,
(v) the first node is associated with a node weight indicative of a code frequency of the first interaction code in the plurality of interaction data objects, and
(vi) the first edge is associated with an edge weight indicative of a code pair frequency for two interaction codes corresponding to the node pair in the plurality of interaction data objects;
generating a relevant network graph by removing one or more outlier nodes of the plurality of nodes;
generating one or more node clusters based on the relevant network graph, the node weight and the edge weight;
generating a class taxonomy for the entity class based on the one or more node clusters, wherein the class taxonomy is indicative of a plurality of homogenous subclasses of the entity class; and
training, by the one or more processors, one or more machine learning models based at least in part on the relevant network graph and the class taxonomy.

13. The computing system of claim 12, wherein the one or more processors are further configured to perform operations comprising:
generating a domain empirical taxonomy for a predictive domain based on the network graph and the class taxonomy, wherein:
(i) the predictive domain comprises a plurality of entity classes,
(ii) the domain empirical taxonomy comprises a respective class taxonomy for the plurality of entity classes, and
(iii) the respective class taxonomy corresponds to a respective network graph; and
providing the domain empirical taxonomy for use in generating a predictive classification for an entity associated with the predictive domain.

14. The computing system of claim 12, wherein the node weight is based on a code count identifying a number of the plurality of interaction data objects that comprise the first interaction code.

15. The computing system of claim 12, wherein the node pair corresponds to the first interaction code and a second interaction code that are associated with the first interaction data object, and wherein the edge weight is based on a code pair count identifying a number of the plurality of interaction data objects that comprise the first interaction code and the second interaction code.

16. The computing system of claim 12, wherein generating the one or more node clusters comprises:
identifying the one or more outlier nodes from the plurality of nodes based on the node weight.

17. The computing system of claim 16, wherein identifying the one or more outlier nodes comprises:
determining one or more node weight thresholds based on an average node weight of the plurality of nodes; and
identifying the one or more outlier nodes based on a comparison between the node weight and the one or more node weight thresholds.

18. The computing system of claim 17, wherein the one or more node weight thresholds comprise at least a first weight threshold and a second weight threshold that define a weight range for the plurality of nodes, and wherein the weight range comprises a three-sigma range from the average node weight.

19. One or more non-transitory computer-readable storage media including instructions that, when executed by one or more processors, cause the one or more processors to perform operations comprising:

generating a network graph for an entity class based on a plurality of interaction data objects corresponding to a plurality of entities of the entity class, wherein:

(i) the plurality of interaction data objects comprises one or more interaction codes, (ii) the network graph comprises a plurality of nodes and a plurality of edges, (iii) a first node of the plurality of nodes corresponds to a first interaction code of at least one of the plurality of interaction data objects, (iv) a first edge of the plurality of edges connects a node pair of the plurality of nodes that is associated with a first interaction data object, (v) the first node is associated with a node weight indicative of a code frequency of the first interaction code in the plurality of interaction data objects, and (vi) the first edge is associated with an edge weight indicative of a code pair frequency for two interaction codes corresponding to the node pair in the plurality of interaction data objects of the plurality of interaction data objects;

generating a relevant network graph by removing one or more outlier nodes of the plurality of nodes;

generating one or more node clusters based on the relevant network graph, the node weight and the edge weight;

generating a class taxonomy for the entity class based on the one or more node clusters, wherein the class taxonomy is indicative of a plurality of homogenous subclasses of the entity class; and training, by the one or more processors, one or more machine learning models based at least in part on the relevant network graph and the class taxonomy.

20. The one or more non-transitory computer-readable storage media of claim 19, wherein the class taxonomy comprises a respective entity subclass label for the one or more node clusters.

\* \* \* \* \*

UNITED STATES PATENT AND TRADEMARK OFFICE
CERTIFICATE OF CORRECTION

PATENT NO. : 12,299,039 B2
APPLICATION NO. : 18/180376
DATED : May 13, 2025
INVENTOR(S) : Savindra Singh et al.

It is certified that error appears in the above-identified patent and that said Letters Patent is hereby corrected as shown below:

In the Claims

In Column 40, Line 59, Claim 2, delete "each of the" and insert -- the --, therefor.

In Column 42, Line 8, Claim 12, delete "objectof" and insert -- object of --, therefor.

In Column 43, Line 24, Claim 19, delete "object," and insert -- object of the plurality of interaction data objects, --, therefor.

In Column 44, Lines 7-8, Claim 19, delete "objects of the plurality of interaction data objects;" and insert -- objects; --, therefor.

Signed and Sealed this
Fifth Day of August, 2025

Coke Morgan Stewart
*Acting Director of the United States Patent and Trademark Office*